US011776533B2

(12) United States Patent
Mont-Reynaud et al.

(10) Patent No.: US 11,776,533 B2
(45) Date of Patent: *Oct. 3, 2023

(54) BUILDING A NATURAL LANGUAGE UNDERSTANDING APPLICATION USING A RECEIVED ELECTRONIC RECORD CONTAINING PROGRAMMING CODE INCLUDING AN INTERPRET-BLOCK, AN INTERPRET-STATEMENT, A PATTERN EXPRESSION AND AN ACTION STATEMENT

(71) Applicant: SoundHound, Inc., Santa Clara, CA (US)

(72) Inventors: Bernard Mont-Reynaud, Sunnyvale, CA (US); Seyed M. Emami, Cupertino, CA (US); Chris Wilson, Sunnyvale, CA (US); Keyvan Mohajer, Los Gatos, CA (US)

(73) Assignee: SoundHound, Inc., Santa Clara, CA (US)

( * ) Notice: Subject to any disclaimer, the term of this patent is extended or adjusted under 35 U.S.C. 154(b) by 186 days.

This patent is subject to a terminal disclaimer.

(21) Appl. No.: 17/225,997

(22) Filed: Apr. 8, 2021

(65) Prior Publication Data
US 2021/0224043 A1 Jul. 22, 2021

Related U.S. Application Data

(63) Continuation of application No. 16/209,854, filed on Dec. 4, 2018, now Pat. No. 10,996,931, which is a (Continued)

(51) Int. Cl.
*G10L 15/00* (2013.01)
*G10L 15/18* (2013.01)
(Continued)

(52) U.S. Cl.
CPC ............. *G10L 15/18* (2013.01); *G06F 8/31* (2013.01); *G06F 40/205* (2020.01); *G10L 15/06* (2013.01); *G10L 15/22* (2013.01); *H04M 3/4938* (2013.01)

(58) Field of Classification Search
CPC ...................... G06F 40/205; G10L 15/1822
See application file for complete search history.

(56) References Cited

U.S. PATENT DOCUMENTS 3,919,479 A 11/1975 Moon et al.
4,450,531 A 5/1984 Kenyon et al.
(Continued)

FOREIGN PATENT DOCUMENTS

EP 0944033 A1 9/1999
EP 1367590 A2 12/2003
(Continued)

OTHER PUBLICATIONS

Murase, T, et al., "Incremental CFG Parsing with Statistical Lexical Dependencies", Proceedings of the Sixth Natural Language Processing Pacific Rim Symposium, Nov. 2001, 9 pgs.
(Continued)

*Primary Examiner* — Daniel Abebe
(74) *Attorney, Agent, or Firm* — Haynes Beffel & Wolfeld LLP; Andrew L. Dunlap; Franklin M. Schellenberg

(57) ABSTRACT

A method of building a natural language understanding application is provided. The method includes receiving at least one electronic record containing programming code and creating executable code from the programming code. Further, the executable code, when executed by a processor, causes the processor to create a parse and an interpretation of a sequence of input tokens, the programming code includes an interpret-block and the interpret-block includes
(Continued)

an interpret-statement. Additionally, the interpret-statement includes a pattern expression and the interpret-statement includes an action statement.

14 Claims, 14 Drawing Sheets

Related U.S. Application Data continuation of application No. 13/843,290, filed on Mar. 15, 2013, now abandoned.

(60) Provisional application No. 61/798,526, filed on Mar. 15, 2013, provisional application No. 61/674,833, filed on Jul. 23, 2012.

(51) Int. Cl.
| | |
|---|---|
| *G06F 40/205* | (2020.01) |
| *G06F 8/30* | (2018.01) |
| *G10L 15/06* | (2013.01) |
| *G10L 15/22* | (2006.01) |
| *H04M 3/493* | (2006.01) |

(56) References Cited

U.S. PATENT DOCUMENTS

| | | | |
|---|---|---|---|
| 4,697,209 A | 9/1987 | Kiewit et al. |
| 4,739,398 A | 4/1988 | Thomas et al. |
| 4,843,562 A | 6/1989 | Kenyon et al. |
| 4,918,730 A | 4/1990 | Schulze |
| 4,928,249 A | 5/1990 | Vermesse |
| 4,959,850 A | 9/1990 | Marui |
| 5,019,899 A | 5/1991 | Boles et al. |
| 5,033,087 A | 7/1991 | Bahl et al. |
| 5,054,074 A | 10/1991 | Bakis |
| 5,164,915 A | 11/1992 | Blyth |
| 5,436,653 A | 7/1995 | Ellis et al. |
| 5,437,050 A | 7/1995 | Lamb et al. |
| 5,457,768 A | 10/1995 | Tsuboi et al. |
| 5,511,000 A | 4/1996 | Kaloi et al. |
| 5,542,138 A | 8/1996 | Williams et al. |
| 5,577,249 A | 11/1996 | Califano |
| 5,581,658 A | 12/1996 | O'Hagan et al. |
| 5,634,084 A | 5/1997 | Malsheen et al. |
| 5,664,270 A | 9/1997 | Bell et al. |
| 5,687,279 A | 11/1997 | Matthews |
| 5,708,477 A | 1/1998 | Forbes et al. |
| 5,845,306 A | 12/1998 | Schabes et al. |
| 5,862,260 A | 1/1999 | Rhoads |
| 5,874,686 A | 2/1999 | Ghias et al. |
| 5,880,386 A | 3/1999 | Wachi et al. |
| 5,907,815 A | 5/1999 | Grimm et al. |
| 5,918,223 A | 6/1999 | Blum et al. |
| 5,956,683 A | 9/1999 | Jacobs et al. |
| 5,963,957 A | 10/1999 | Hoffberg |
| 5,969,283 A | 10/1999 | Looney et al. |
| 5,974,409 A | 10/1999 | Sanu et al. |
| 5,991,737 A | 11/1999 | Chen |
| 6,049,710 A | 4/2000 | Nilsson |
| 6,067,516 A | 5/2000 | Levay et al. |
| 6,092,039 A | 7/2000 | Zingher |
| 6,098,042 A | 8/2000 | Huynh |
| 6,108,626 A | 8/2000 | Cellario et al. |
| 6,121,530 A | 9/2000 | Sonoda |
| 6,122,403 A | 9/2000 | Rhoads |
| 6,163,767 A | 12/2000 | Tang et al. |
| 6,182,128 B1 | 1/2001 | Kelkar et al. |
| 6,188,985 B1 | 2/2001 | Thrift et al. |
| 6,201,176 B1 | 3/2001 | Yourlo |
| 6,233,682 B1 | 5/2001 | Fritsch |
| 6,246,986 B1 | 6/2001 | Ammicht et al. |
| 6,292,767 B1 | 9/2001 | Jackson et al. |
| 6,314,577 B1 | 11/2001 | Pocock |
| 6,345,256 B1 | 2/2002 | Milsted et al. |
| 6,363,349 B1 | 3/2002 | Urs et al. |
| 6,385,434 B1 | 5/2002 | Chuprun et al. |
| 6,405,029 B1 | 6/2002 | Nilsson |
| 6,408,272 B1 | 6/2002 | White et al. |
| 6,434,520 B1 | 8/2002 | Kanevsky et al. |
| 6,453,252 B1 | 9/2002 | Laroche |
| 6,487,532 B1 | 11/2002 | Schoofs et al. |
| 6,504,089 B1 | 1/2003 | Negishi et al. |
| 6,505,160 B1 | 1/2003 | Levy et al. |
| 6,507,727 B1 | 1/2003 | Rick |
| 6,510,325 B1 | 1/2003 | Mack, II et al. |
| 6,519,564 B1 | 2/2003 | Hoffberg et al. |
| 6,535,849 B1 | 3/2003 | Pakhomov et al. |
| 6,542,869 B1 | 4/2003 | Foote |
| 6,594,628 B1 | 7/2003 | Jacobs et al. |
| 6,611,607 B1 | 8/2003 | Davis et al. |
| 6,614,914 B1 | 9/2003 | Rhoads et al. |
| 6,629,066 B1 | 9/2003 | Jackson et al. |
| 6,631,346 B1 | 10/2003 | Karaorman et al. |
| 6,633,845 B1 | 10/2003 | Logan et al. |
| 6,633,846 B1 | 10/2003 | Bennett et al. |
| 6,640,306 B1 | 10/2003 | Tone et al. |
| 6,708,150 B1 | 3/2004 | Hirayama et al. |
| 6,804,645 B1 | 10/2004 | Kleinschmidt |
| 6,834,308 B1 | 12/2004 | Ikezoye et al. |
| 6,850,288 B2 | 2/2005 | Kurokawa |
| 6,879,950 B1 | 4/2005 | Mackie et al. |
| 6,931,451 B1 | 8/2005 | Logan et al. |
| 6,941,275 B1 | 9/2005 | Swierczek |
| 6,967,275 B2 | 11/2005 | Ozick |
| 6,990,453 B2 | 1/2006 | Wang et al. |
| 6,995,309 B2 | 2/2006 | Samadani et al. |
| 6,996,529 B1 | 2/2006 | Minnis |
| 7,017,208 B2 | 3/2006 | Weismiller et al. |
| 7,058,376 B2 | 6/2006 | Logan et al. |
| 7,085,716 B1 | 8/2006 | Even et al. |
| 7,089,541 B2* | 8/2006 | Ungar ............... G06F 8/427 |
| | | 717/112 |
| 7,174,293 B2 | 2/2007 | Kenyon et al. |
| 7,190,971 B1 | 3/2007 | Kawamoto |
| 7,206,820 B1 | 4/2007 | Rhoads et al. |
| 7,209,892 B1 | 4/2007 | Galuten et al. |
| 7,225,132 B2 | 5/2007 | Attwater et al. |
| 7,233,321 B1 | 6/2007 | Larson et al. |
| 7,257,536 B1 | 8/2007 | Finley et al. |
| 7,266,343 B1 | 9/2007 | Yli-juuti et al. |
| 7,266,495 B1 | 9/2007 | Beaufays et al. |
| 7,323,629 B2 | 1/2008 | Somani et al. |
| 7,328,153 B2 | 2/2008 | Wells et al. |
| 7,373,209 B2 | 5/2008 | Tagawa et al. |
| 7,379,875 B2 | 5/2008 | Burges et al. |
| 7,444,353 B1 | 10/2008 | Chen et al. |
| 7,464,065 B2 | 12/2008 | Gleason et al. |
| 7,516,074 B2 | 4/2009 | Bilobrov |
| 7,562,392 B1 | 7/2009 | Rhoads et al. |
| 7,567,899 B2 | 7/2009 | Bogdanov |
| 7,580,832 B2 | 8/2009 | Allamanche et al. |
| 7,606,708 B2 | 10/2009 | Hwang |
| 7,672,916 B2 | 3/2010 | Poliner et al. |
| 7,693,720 B2 | 4/2010 | Kennewick et al. |
| 7,698,136 B1 | 4/2010 | Nguyen et al. |
| 7,725,319 B2 | 5/2010 | Aronowitz |
| 7,743,092 B2 | 6/2010 | Wood |
| 7,756,874 B2 | 7/2010 | Hoekman et al. |
| 7,765,097 B1 | 7/2010 | Yu et al. |
| 7,783,489 B2 | 8/2010 | Kenyon et al. |
| 7,853,664 B1 | 12/2010 | Wang et al. |
| 7,858,868 B2 | 12/2010 | Kemp et al. |
| 7,881,657 B2 | 2/2011 | Wang et al. |
| 7,899,818 B2 | 3/2011 | Stonehocker et al. |
| 7,904,297 B2 | 3/2011 | Mirkovic et al. |
| 7,908,135 B2 | 3/2011 | Shishido |
| 8,013,230 B2 | 9/2011 | Eggink |
| 8,073,684 B2 | 12/2011 | Sundareson |
| 8,086,171 B2 | 12/2011 | Wang et al. |
| 8,099,281 B2 | 1/2012 | Gleason |
| 8,116,746 B2 | 2/2012 | Lu et al. |
| 8,296,179 B1 | 10/2012 | Rennison |

(56) References Cited

U.S. PATENT DOCUMENTS

| | | |
|---|---|---|
| 8,358,966 B2 | 1/2013 | Zito et al. |
| 8,447,608 B1 | 5/2013 | Chang et al. |
| 8,694,537 B2 | 4/2014 | Mohajer |
| 8,762,156 B2 | 6/2014 | Chen |
| 8,843,369 B1 | 9/2014 | Sharifi |
| 8,924,212 B1 | 12/2014 | Allauzen et al. |
| 9,646,628 B1 | 5/2017 | Carlson et al. |
| 9,697,827 B1 | 7/2017 | Lilly et al. |
| 10,224,030 B1 | 3/2019 | Kiss et al. |
| 2001/0005823 A1 | 6/2001 | Fischer et al. |
| 2001/0014891 A1 | 8/2001 | Hoffert et al. |
| 2001/0049601 A1 | 12/2001 | Kroeker et al. |
| 2001/0053974 A1 | 12/2001 | Lucke et al. |
| 2002/0023020 A1 | 2/2002 | Kenyon et al. |
| 2002/0042707 A1 | 4/2002 | Zhao et al. |
| 2002/0048350 A1 | 4/2002 | Phillips et al. |
| 2002/0049037 A1 | 4/2002 | Christensen et al. |
| 2002/0072982 A1 | 6/2002 | Barton et al. |
| 2002/0083060 A1 | 6/2002 | Wang et al. |
| 2002/0111806 A1 | 8/2002 | Franz et al. |
| 2002/0116191 A1 | 8/2002 | Olsen et al. |
| 2002/0138265 A1 | 9/2002 | Stevens et al. |
| 2002/0138630 A1 | 9/2002 | Solomon et al. |
| 2002/0156627 A1 | 10/2002 | Itoh et al. |
| 2002/0174431 A1 | 11/2002 | Bowman et al. |
| 2002/0181671 A1 | 12/2002 | Logan |
| 2002/0193895 A1 | 12/2002 | Qian et al. |
| 2002/0198705 A1 | 12/2002 | Burnett |
| 2002/0198713 A1 | 12/2002 | Franz et al. |
| 2002/0198719 A1 | 12/2002 | Gergic et al. |
| 2002/0198789 A1 | 12/2002 | Waldman |
| 2003/0004717 A1 | 1/2003 | Strom et al. |
| 2003/0009335 A1 | 1/2003 | Schalkwyk et al. |
| 2003/0023437 A1 | 1/2003 | Fung |
| 2003/0040901 A1 | 2/2003 | Wang |
| 2003/0050784 A1 | 3/2003 | Hoffberg et al. |
| 2003/0078928 A1 | 4/2003 | Dorosario et al. |
| 2003/0083863 A1 | 5/2003 | Ringger et al. |
| 2003/0106413 A1 | 6/2003 | Samadani et al. |
| 2003/0110035 A1 | 6/2003 | Thong et al. |
| 2003/0125945 A1 | 7/2003 | Doyle |
| 2003/0163320 A1 | 8/2003 | Yamazaki et al. |
| 2003/0167166 A1 | 9/2003 | Mann |
| 2003/0187649 A1 | 10/2003 | Logan et al. |
| 2003/0191645 A1 | 10/2003 | Zhou |
| 2003/0192424 A1 | 10/2003 | Koike |
| 2003/0233225 A1* | 12/2003 | Bond .................... G06F 40/284 704/4 |
| 2004/0002858 A1 | 1/2004 | Attias et al. |
| 2004/0019497 A1 | 1/2004 | Volk et al. |
| 2004/0167779 A1 | 8/2004 | Lucke et al. |
| 2004/0193420 A1 | 9/2004 | Kennewick et al. |
| 2004/0231498 A1 | 11/2004 | Li et al. |
| 2005/0010412 A1 | 1/2005 | Aronowitz |
| 2005/0016360 A1 | 1/2005 | Zhang |
| 2005/0027699 A1 | 2/2005 | Awadallah et al. |
| 2005/0033574 A1 | 2/2005 | Kim et al. |
| 2005/0060685 A1 | 3/2005 | Franz et al. |
| 2005/0086059 A1 | 4/2005 | Bennett |
| 2005/0125232 A1 | 6/2005 | Gadd |
| 2005/0137939 A1 | 6/2005 | Calabria et al. |
| 2005/0143970 A1 | 6/2005 | Roth et al. |
| 2005/0144064 A1 | 6/2005 | Calabria et al. |
| 2005/0144065 A1 | 6/2005 | Calabria et al. |
| 2005/0254366 A1 | 11/2005 | Amar |
| 2005/0256715 A1 | 11/2005 | Okimoto et al. |
| 2005/0273326 A1 | 12/2005 | Padhi et al. |
| 2006/0004572 A1 | 1/2006 | Ju et al. |
| 2006/0059225 A1 | 3/2006 | Stonehocker et al. |
| 2006/0069547 A1 | 3/2006 | Wang et al. |
| 2006/0095250 A1 | 5/2006 | Chen et al. |
| 2006/0122839 A1 | 6/2006 | Li-Chun Wang et al. |
| 2006/0129396 A1 | 6/2006 | Ju et al. |
| 2006/0155694 A1 | 7/2006 | Chowdhury et al. |
| 2006/0169126 A1 | 8/2006 | Ishiwata et al. |
| 2006/0189298 A1 | 8/2006 | Marcelli |
| 2006/0200350 A1 | 9/2006 | Attwater et al. |
| 2006/0224384 A1 | 10/2006 | Dow et al. |
| 2006/0242017 A1 | 10/2006 | Libes et al. |
| 2006/0277030 A1 | 12/2006 | Bedworth |
| 2006/0277052 A1 | 12/2006 | He et al. |
| 2006/0282266 A1 | 12/2006 | Lopez-Barquilla et al. |
| 2007/0010195 A1 | 1/2007 | Brown et al. |
| 2007/0016404 A1 | 1/2007 | Kim et al. |
| 2007/0038453 A1 | 2/2007 | Yamamoto et al. |
| 2007/0055500 A1 | 3/2007 | Bilobrov |
| 2007/0120689 A1 | 5/2007 | Zerhusen et al. |
| 2007/0156392 A1 | 7/2007 | Balchandran et al. |
| 2007/0168409 A1 | 7/2007 | Cheung |
| 2007/0168413 A1 | 7/2007 | Barletta et al. |
| 2007/0204319 A1 | 8/2007 | Ahmad et al. |
| 2007/0208569 A1 | 9/2007 | Subramanian et al. |
| 2007/0239676 A1 | 10/2007 | Stonehocker et al. |
| 2007/0260456 A1 | 11/2007 | Proux et al. |
| 2007/0260634 A1 | 11/2007 | Makela et al. |
| 2007/0288444 A1 | 12/2007 | Nelken et al. |
| 2008/0022844 A1 | 1/2008 | Poliner et al. |
| 2008/0026355 A1 | 1/2008 | Petef |
| 2008/0046247 A1 | 2/2008 | Kurata et al. |
| 2008/0059185 A1 | 3/2008 | Chung et al. |
| 2008/0059188 A1 | 3/2008 | Konopka et al. |
| 2008/0071520 A1 | 3/2008 | Sanford |
| 2008/0082510 A1 | 4/2008 | Wang et al. |
| 2008/0126089 A1 | 5/2008 | Printz et al. |
| 2008/0134264 A1 | 6/2008 | Narendra et al. |
| 2008/0148224 A1 | 6/2008 | Donovan et al. |
| 2008/0154951 A1 | 6/2008 | Martinez et al. |
| 2008/0172224 A1 | 7/2008 | Liu et al. |
| 2008/0215319 A1 | 9/2008 | Lu et al. |
| 2008/0228496 A1 | 9/2008 | Yu et al. |
| 2008/0235017 A1 | 9/2008 | Satomura |
| 2008/0235872 A1 | 10/2008 | Newkirk et al. |
| 2008/0249982 A1 | 10/2008 | Lakowske |
| 2008/0255937 A1 | 10/2008 | Chang et al. |
| 2008/0256115 A1 | 10/2008 | Beletski et al. |
| 2008/0270129 A1 | 10/2008 | Colibro et al. |
| 2009/0013255 A1 | 1/2009 | Yuschik et al. |
| 2009/0030686 A1 | 1/2009 | Weng et al. |
| 2009/0031882 A1 | 2/2009 | Kemp et al. |
| 2009/0037174 A1 | 2/2009 | Seltzer et al. |
| 2009/0063147 A1 | 3/2009 | Roy |
| 2009/0064029 A1 | 3/2009 | Corkran et al. |
| 2009/0112593 A1 | 4/2009 | Konig et al. |
| 2009/0119097 A1 | 5/2009 | Master et al. |
| 2009/0125298 A1 | 5/2009 | Master et al. |
| 2009/0125301 A1 | 5/2009 | Master et al. |
| 2009/0125306 A1 | 5/2009 | Lejeune et al. |
| 2009/0150341 A1 | 6/2009 | Paek et al. |
| 2009/0216525 A1 | 8/2009 | Shostak |
| 2009/0228799 A1 | 9/2009 | Verbeeck et al. |
| 2009/0240488 A1 | 9/2009 | White et al. |
| 2009/0240499 A1 | 9/2009 | Dvir et al. |
| 2009/0271199 A1 | 10/2009 | Agapi et al. |
| 2010/0014828 A1 | 1/2010 | Sandstrom et al. |
| 2010/0042414 A1 | 2/2010 | Lewis et al. |
| 2010/0049514 A1 | 2/2010 | Kennewick et al. |
| 2010/0100384 A1 | 4/2010 | Ju et al. |
| 2010/0124892 A1 | 5/2010 | Issa et al. |
| 2010/0158488 A1 | 6/2010 | Roberts et al. |
| 2010/0205166 A1 | 8/2010 | Boulter et al. |
| 2010/0211693 A1 | 8/2010 | Master et al. |
| 2010/0235341 A1 | 9/2010 | Bennett |
| 2010/0241418 A1 | 9/2010 | Maeda et al. |
| 2010/0250497 A1 | 9/2010 | Redlich et al. |
| 2010/0286979 A1 | 11/2010 | Zangvil et al. |
| 2010/0312782 A1 | 12/2010 | Li et al. |
| 2011/0035219 A1 | 2/2011 | Kadirkamanathan et al. |
| 2011/0046951 A1 | 2/2011 | Suendermann et al. |
| 2011/0071819 A1 | 3/2011 | Miller et al. |
| 2011/0082688 A1 | 4/2011 | Kim et al. |
| 2011/0131043 A1 | 6/2011 | Adachi et al. |
| 2011/0132173 A1 | 6/2011 | Shishido |
| 2011/0132174 A1 | 6/2011 | Shishido |
| 2011/0173208 A1 | 7/2011 | Vogel |

(56) References Cited

U.S. PATENT DOCUMENTS

| | | | |
|---|---|---|---|
| 2011/0213475 A1 | 9/2011 | Herberger et al. | |
| 2011/0244784 A1 | 10/2011 | Wang | |
| 2011/0276334 A1 | 11/2011 | Wang et al. | |
| 2011/0288855 A1 | 11/2011 | Roy | |
| 2012/0029670 A1 | 2/2012 | Mont-Reynaud et al. | |
| 2012/0035924 A1 | 2/2012 | Jitkoff et al. | |
| 2012/0046936 A1 | 2/2012 | Kandekar et al. | |
| 2012/0065960 A1 | 3/2012 | Iwama et al. | |
| 2012/0089400 A1 | 4/2012 | Henton | |
| 2012/0216178 A1 | 8/2012 | Gellerich et al. | |
| 2012/0232683 A1 | 9/2012 | Master et al. | |
| 2012/0303371 A1 | 11/2012 | Labsky et al. | |
| 2012/0323557 A1 | 12/2012 | Koll et al. | |
| 2013/0006631 A1 | 1/2013 | Gunther et al. | |
| 2013/0041647 A1 | 2/2013 | Ramerth et al. | |
| 2013/0052939 A1 | 2/2013 | Anniballi et al. | |
| 2013/0055223 A1 | 2/2013 | Xu | |
| 2013/0096911 A1 | 4/2013 | Beaufort et al. | |
| 2013/0111440 A1* | 5/2013 | Forster | G06F 8/70 717/121 |
| 2013/0151250 A1 | 6/2013 | VanBlon | |
| 2014/0019483 A1 | 1/2014 | Mohajer | |
| 2014/0032220 A1 | 1/2014 | Lerner | |
| 2014/0039895 A1 | 2/2014 | Aravamudan et al. | |
| 2014/0067394 A1 | 3/2014 | Abuzeina et al. | |
| 2014/0074470 A1 | 3/2014 | Jansche et al. | |
| 2014/0205974 A1 | 7/2014 | Pellom et al. | |
| 2014/0297252 A1 | 10/2014 | Prasad et al. | |
| 2014/0316785 A1 | 10/2014 | Bennett et al. | |
| 2014/0324427 A1 | 10/2014 | Di Fabbrizio et al. | |
| 2014/0324433 A1 | 10/2014 | Hsiao | |
| 2014/0358533 A1 | 12/2014 | Kurata et al. | |
| 2015/0039317 A1 | 2/2015 | Klein et al. | |
| 2015/0106082 A1 | 4/2015 | Ge et al. | |
| 2015/0112679 A1 | 4/2015 | Zhang | |
| 2015/0161985 A1 | 6/2015 | Peng et al. | |
| 2016/0148615 A1 | 5/2016 | Lee et al. | |
| 2016/0232894 A1 | 8/2016 | Park et al. | |
| 2017/0178623 A1 | 6/2017 | Shamir et al. | |
| 2018/0061399 A1 | 3/2018 | Rose et al. | |
| 2018/0308489 A1 | 10/2018 | Pan et al. | |
| 2018/0330723 A1 | 11/2018 | Acero et al. | |
| 2022/0374708 A1* | 11/2022 | Rozenfarb | G06N 3/08 |

FOREIGN PATENT DOCUMENTS

| | | |
|---|---|---|
| JP | H11-272274 A | 10/1999 |
| JP | 2000187671 A | 7/2000 |
| WO | 1517746 A1 | 6/1995 |
| WO | 99/18518 A2 | 4/1999 |
| WO | 03061285 A2 | 7/2003 |
| WO | 2004091307 A2 | 10/2004 |
| WO | 2008004181 A2 | 1/2008 |
| WO | 2010018586 A2 | 2/2010 |
| WO | 2013177213 A2 | 11/2013 |

OTHER PUBLICATIONS

New, B., "Question Answering at TREC", Pre-Internship report, Mar. 2008. 4 pgs.
Nortel Norstar, "Voice Mail Speech Recognition Automated Attendant", Product manual [online]. 29 pgs. Nortel Norstar [retrieved Sep. 4, 2012]. Retrieved from the Internet: <URL: https://downloads.avaya.com/css/P8/documents/100141923>.
Norvell, T., "A Short Introduction to Regular Expressions and Context Free Grammars", Project report, Nov. 2002, 5 pgs.
Quesada, J, et al. "Design of a Natural Language Command Dialogue System". Project deliverable 3.2, SIRIDUS, 2000, 91 pgs.
Seneff, S., "TINA: A Natural Language System for Spoken Language Applications", Journal of the Association for Computational Linguistics, 18 (1), pp. 61-82, Mar. 1992.
Seneff, S., et al., "Galaxy—II: A Reference Architecture for Conversational System Development", Proceedings of the International Conference on Spoken Language Processing, Nov. 1998, 5 pgs.
Stolcke, A., "An Efficient Probabilistic Context-Free Parsing Algorithm that Computes Prefix Probabilities", Journal of the Association for Computational Linguistics, 21 (2), Jun. 1995, pp. 165-201.
"Do you know the true cost of IVR migration?" Datasheet. Aspect Software Incorporated, Dec. 2012, 4 pgs.
Zlatanov, T. "Cultured Perl", Nov. 2004, 13 pgs. [retrieved Oct. 22, 2014]. Retrieved from the Internet: <URL: http://www.ibm.com/developerworks/linux/library/l-cpregex/index.html>.
Younger, D. H., "Recognition and parsing of context-free languages in time n3", Information and Control, vol. 10, Issue 2, Feb. 1967, pp. 189-208.
Guzzino, Didier, "Active: A Unified Platform for Building Intelligent Applications", Jan. 23, 2008, 263 pgs.
"Nuance Recognizer 9.0: Language Pack Guide", Nuance Communications, Inc., 2007, 34 pgs.
U.S. Appl. No. 13/842,735—Office Action dated Feb. 20, 2015, 12 pages.
U.S. Appl. No. 13/480,400—Office Action dated May 7, 2013, 15 pages.
U.S. Appl. No. 13/480,400—Response to May 7 Office Action filed Jul. 8, 2013, 16 pages.
U.S. Appl. No. 13/843,290—Notice of Allowance dated Jan. 23, 2015, 9 pages.
U.S. Appl. No. 13/844,028—Office Action dated Nov. 7, 2014, 15 pages.
PCT/US2009/066458—International Search Report, dated Jun. 23, 2010, 16 pages.
InData Corporation, DepoView Video Review Software Product Description, "InData's Newest Video Deposition Viewer", Dec. 2007, 2 pgs.
InData Corporation, DepoView DVD, Video Review Software Product Brochure, Jun. 2008, 4 Pgs.
InData Corporation, DepoView Video Review Software Product Description, http://indatacorp.com/depoview.html, accessed Nov. 8, 2011, 2 Pgs.
Sony Ericsson's W850i Walkman Phone Now Available in the Middle East. Al-Bawaba News, 2006 Al-Bawaba. Dec. 11, 2006. Factiva, Inc. <www.albawaba.com>. 2 pages.
Blackburn, S G., "Content Based Retrieval and Navigation of Music," University of Southampton, Department of Electronics and Computer Science, Faculty of Engineering and Applied Science, Mar. 10, 1999, 41 Pages.
Blackburn, S., et al. "A Tool for Content Based Navigation of Music," University of Southampton, Department of Electronics and Computer Science, Multimedia Research Group, Copyright 1998 ACM 1-58113-036-8/98/0008, pp. 361-368.
Blackburn, S G., "Content Based Retrieval and Navigation of Music Using Melodic Pitch Contours," University of Southampton, Department of Electronics and Computer Science, Faculty of Engineering and Applied Science, Sep. 26, 2000, 136 Pages.
Blackburn, S G. "Search by Humming". University of Southampton, Department of Electronics and Computer Science, Faculty of Engineering, May 8, 1997, 69 Pages.
Hum That Tune, Then Find it on the Web. NPR: Weekend Edition— Saturday, WKSA. Copyright 2006 National Public Radio. Dec. 23, 2006. Factiva, Inc. 2 pages.
Casey, M. A., et al., "Content-Based Music Information Retrieval: Current Directions and Future Challenges". Apr. 2008, vol. 96, No. 4, Copyright 2008 IEEE, Retrieved from IEEE Xplore [retrieved on Dec. 29, 2008 at 18:02], 29 Pages.
Wagstaff, J., "Loose Wire: New Service Identifies Songs You Hum," WSJA Weekend Journal. Copyright 2006, Dow Jones & Company, Inc. Dec. 25, 2006. Factiva, Inc. 2 pages.
Saltzman, M., "The Best Things in life are Free—For Your iPhone," Home Electronics and Technology, for Canwest News Service. Copyright 2008 Edmonton Journal. Nov. 12, 2008. Factiva, Inc. 2 pages.
First Products with Gracenote Technology to Ship in 2008. Warren's Consumer Electronics Daily. Copyright 2007 Warren Publishing, Inc. Sep. 18, 2007. Factiva, Inc. 2 pages.

(56) References Cited

OTHER PUBLICATIONS

Gracenote Readies New Services, But Video Initiative Stalls. Warren's Consumer Electronics Daily. Copyright 2005 Warren Publishing, Inc. vol. 5; Issue 122. Jun. 24, 2005. Factiva, Inc. 2 pages.
Furui, S., "Digital Speech Processing, Synthesis, and Recognition". Second Edition, Revised and Expanded. Nov. 17, 2000. ISBN 978-0824704520. 17 pages.
Ghias, A., et al. "Query by Humming," Musical Information Retrieval in an Audio Database, Cornell University 1995, 6 Pages.
Ghias, A., et al. "Query by Humming—Musical Information Retrieval in an Audio Database," ACM Multimedia 95—Electronic Proceedings, San Francisco, CA, Nov. 5-9, 1995, 13 Pages.
Han, B., et al. "M-Musics: Mobile Content-Based Music Retrieval System". Copyright 2007, Augsburg, Bavaria, Germany. ACM 978-1-59593-01-8/07/0009. Sep. 23-28, 2007. pp. 469-470. 2 Pages.
Jang, J.R., et al. "A General Framework of Progressive Filtering and its Application to Query to Singing/Humming". IEEE Transactions on Audio, Speech, and Language Processing, vol. 16. No. 2, Feb. 2008. pp. 350-358. 9 Pages.
Kosugi, N., et al. "A Practical Query-By-Humming System for a Large Music Database". NTT Laboratories, Japan. ACM Multimedia Los Angeles, Ca, USA. Copyright ACM 2000 1-58113-198-4/00/10. pp. 333-342. 10 Pages.
McNab, R. J., et al. "Towards the Digital Music Library: Tune Retrieval from Acoustic Input". University of Waikato, Department of Computer Science, School of Education. DL 1996, Bethesda MD USA. Copyright 1996 ACM 0-89791-830-4/96/03. pp. 11-18. 8 Pages.
McNab, R. J., et al. "The New Zealand Digital Library MELody inDEX". University of Waikato, Department of Computer Science. D-Lib Magazine, May 1997 [retrieved on Jun. 12, 2011 at 11:25:49 AM]. ISSN 1082-9873. Retrieved from the Internet: <http://dlib.org/dlib/May97/meldex/05wiillen.html>, 13 pages.
Pardo, B., et al. "The VocalSearch Music Search Engine". EECS, Northwestern University. JCDL 2008, Pittsburgh, Pennsylvania, USA. Jun. 16-20, 2008, ACM 978-1-59593-998-2/08/06. p. 430. 1 Page.
Mobile Music: Comcast Cellular First in U.S. to Trial Breakthrough Interactive Music Service Called *CD. Copyright PR Newswire, New York. ProQuest LLC. Feb. 11, 1999. Retrieved from the Internet: <http://proquest.umi.com.libproxy.mit.edu/pqdwb?did+38884944&sid=3&Fmt=3&clientId=5482&RQT=309&VName=PQD>. 3 pages.
Song, J., et al. "Query by Humming: Matching Humming Query to Polyphonic Audio," LG Electronics, Seoul, Korea. Copyright 2002 IEEE. 0-7809-7304-9/02. pp. 329-332. 4 Pages.
Taylor, C., "Company Lets Listeners Dial for CDs," Billboard, vol. 1, No. 26, General Interest Module, Jun. 26, 1999, pp. 86-87, 2 pages.
"Can't Get That Song Out of Your Head," Copyright 2007, The Jakarta Post, May 20, 2007, Factiva, Inc, 2 Pages.
Typke, R., et al., "A Survey of Music Information Retrieval Systems," Universiteit Utrecht, The Netherlands. Copyright 2005 Queen Mary, University of London. 8 Pages.
Wang, A., "The Shazam Music Recognition Service". Communications of the ACM, vol. 49, No. 8. Aug. 2006. ACM 0001-0782/06/0800. pp. 44-48. 5 pages.
Melodis Rolls Out midomi mobile. Wireless News. Copyright 2008 M2 Communications, Ltd. Mar. 6, 2008. 1 Page.
Zhu, Y., et al. "Warping Indexes with Envelope Transforms for Query by Humming". New York University, New York. SIGMOD Copyright 2003, San Diego, CA. Jun. 9-12, 2003. ACM 1-58113-634-X/03/06. pp. 181-192. 12 Pages.
U.S. Appl. No. 13/843,290—Notice of Allowance dated Aug. 15, 2016, 5 pages.
U.S. Appl. No. 13/843,290—Response to Notice of Allowance dated Aug. 15, 2016, filed Nov. 15, 2016, 11 pages.
U.S. Appl. No. 13/842,735—Final Office Action dated May 22, 2017, 10 pages.
U.S. Appl. No. 13/843,290—Notice of Allowance dated Sep. 5, 2017, 7 pages.
De Mareail, Philippe Boula, et al. "A French Phonetic Lexicon with Variants for Speech and Language Processing." LREC. Jun. 2000, pp. 1-4.
Perennou, Guy, et al. "MHATLex: Lexical Resources for Modelling the French Pronunciation." LREC. Jun. 2000, pp. 1-8.
Ranbom, Larissa J., et al. "Lexical representation of phonological variation in spoken word recognition." Journal of Memory and Language 57.2, Aug. 2007, pp. 273-298.
Svendsen, Torbjorn. "Pronunciation modeling for speech technology." Proc. Intl. Conf. on Signal Processing and Communication (SPCOM04), Jan. 2005, pp. 1-6.
Young, S. L., et al. "High level knowledge sources in usable speech recognition systems." Communications of the ACM 32.2, Feb. 1989, pp. 183-194.
Gaudinat, Amaud, et al. "Syntax-based speech recognition: how a syntactic parser can help a recognition system." EuroSpeech. Sep. 1999, pp. 1-4.
U.S. Appl. No. 14/634,642—Non-final Office Action dated Sep. 22, 2017, 24 pages.
U.S. Appl. No. 13/842,735—Response to Final Office Action dated May 22, 2017, filed Nov. 21, 2017, 11 pages.
U.S. Appl. No. 13/842,735—Nonfinal Office Action dated Dec. 15, 2017, 14 pages.
U.S. Appl. No. 13/843,290—Response after Notice of Allowance dated Sep. 5, 2017, filed Nov. 27, 2017, 10 pages.
U.S. Appl. No. 13/843,290—Notice of Allowance dated Jan. 31, 2018, 5 pages.
U.S. Appl. No. 13/193,514—Response to Aug. 22, 2014 Office Action, filed Dec. 22, 2014, 11 pages.
U.S. Appl. No. 14/634,642—Notice of Allowance dated Mar. 7, 2018, 22 pages.
Yao, "The Effects of Phonological Neighborhoods in Pronunication Variation in Conversational Speech", UC Berkeley Electroinic Theses and Dissertatioms, Jan. 1, 2011, 218 pages.
U.S. Appl. No. 14/634,642—Response to Non-final Office Action dated Sep. 22, 2017 filed Jan. 22, 2018, 29 pages.
U.S. Appl. No. 14/634,642—Supplemental Response to Non-final Office Action dated Sep. 22, 2017 filed Jan. 22, 2018, 15 pages.
U.S. Appl. No. 14/634,642—Interview Summary and Proposed Examiner's Amendment filed Jan. 30, 2018, 10 pages.
U.S. Appl. No. 14/634,642—Amendment with RCE filed Jun. 6, 2018, 14 pages.
U.S. Appl. No. 14/634,642—Non-final Office Action dated Jun. 27, 2018, 14 pages.
U.S. Appl. No. 14/634,642—Response to Non-final Office Action dated Jun. 27, 2018 filed Dec. 27, 2018, 9 pages.
U.S. Appl. No. 14/634,642—Final Office Action dated Feb. 12, 2019, 12 pages.
Huet, et al., "Morpho-syntactic post-processing of N-best lists for improved French automatic speech recognition", Computer Speech and Langauge; ScienceDirect; 22 pages; received Jul. 9, 2008; available online Oct. 30, 2009.
U.S. Appl. No. 13/843,290—Response after Notice of Allowance dated Jan. 18, 2018, filed Apr. 25, 2018, 10 pages.
U.S. Appl. No. 13/843,290—Notice of Allowance dated Sep. 5, 2018, 11 pages.
U.S. Appl. No. 13/842,735—Response to Office Action dated 125 Jun. 2019, filed Nov. 25, 2019, 11 pages.
U.S. Appl. No. 13/842,735—Final Office Action dated Dec. 13, 2019, 14 pages.
PCT/US2009/066458—International Preliminary Report on Patentability dated Jun. 7, 2011, 7 pages.
U.S. Appl. No. 60/222,023—Wang, et al., "Method and Apparatus for Recognizing Sound and Music Signals in High Noise and Distortion" filed Jul. 31, 2000, 26 pages.
U.S. Appl. No. 60/134,782—Rhoads, G., "Methods and Systems Employing Digital Watermarking," filed May 19, 1999, 47 pages.
U.S. Appl. No. 60/166,965—Finley, M., et al., "Broadcast Media Purchasing System," filed Nov. 23, 1999, 21 pages.
U.S. Appl. No. 60/158,087—Swierczek, R., "Music Identification System," filed Oct. 7, 1999, 12 pages.

(56) References Cited

OTHER PUBLICATIONS

U.S. Appl. No. 60/186,565—Swierczek, R., "Music Identification System," filed Mar. 2, 2000, 14 pages.
Chou, T., et al., "Music Databases: Indexing Techniques and Implementation", Proceedings of International Workshop on Multimedia Database Management Systems, IEEE, dated Aug. 14-16, 1996, pp. 46-53, 8 pages.
McPherson, J.R., et al., "Usage of the MELDEX Digital Music Library", 1999, in Proceedings of the International Symposium on Music Information Retrieval, (Bloomington, IN, USA, 2001), pp. 19-20, 2 pages.
Wold, E., et al., "Classification, Search, and Retrieval of Audio", Muslce Fish, Berkeley, CA, USA, CRC Handbook of Multimedia Computing 1999, pp. 1-19, 18 pages.
Wold, et al., "Content-Based Classification, Search and Retrieval of Audio", IEEE Multimedia 1070-986X/96, vol. 3, No. 3: Fall 1996, pp. 27-36 (17 pages).
Horn, P., "What was that song? With a wireless phone, find out what you heard on the radio," The Inquirer, Philadelphia, Pennsylvania, USA, dated Feb. 11, 1999, 3 pages.
U.S. Appl. No. 60/218,824—Kenyon, S., et al., "Audio Identification System and Method," filed Jul. 18, 2000, 45 pages.
U.S. Appl. No. 60/155,064—Kenyon, S., "Automatic Program Identification System and Method," filed Sep. 21, 1999, 49 pages.
U.S. Appl. No. 13/401,728—Notice of Allowance dated Mar. 4, 2015, 8 pages.
U.S. Appl. No. 13/401,728—Office Action dated Jul. 17, 2014, 11 pages.
U.S. Appl. No. 13/193,514—Office Action dated Jul. 17, 2015, 16 pages.
U.S. Appl. No. 13/193,514—Office Action dated Aug. 22, 2014, 21 pages.
U.S. Appl. No. 13/193,514—Office Action dated Jan. 6, 2014, 21 pages.
U.S. Appl. No. 13/193,514—Response to Jan. 6 Office Action filed May 6, 2014, 11 pages.
Amdal, et al., "Pronunciation variation modeling in automatic speech recogniction", Teletronikk 99.2, Feb. 2003, pp. 70-82.
Bisani, et al., "Joint-sequence models for grapheme-to-phoneme conversion", Speech Communication 50.5, May 2008, pp. 434-451.
Harrison, et al., "Improving mispronunciation detection and diagnosis of learners' speech with context-sensitive phonological rules bases on language transfer", INTERSPEECH, Sep. 2008, pp. 2787-2790.
Tesprasit, et al., "A context-sensitive homograph disambiguation in Thai text-to-speech synthesis", Proceedings of the 2003 Conference of the North American Chapter of the Association for Computational Linguistics on Human Language Technology: companion volume of hte Proceedings of HLT-NAACL 2003, (2003), pp. 1-3.
U.S. Appl. No. 14/634,642—Office Action dated Mar. 23, 2016, 15 pages.
Phillips, W., "Introduction to Natural Language Processing," CCSI 2006 The Mind Project, retrieved online: <http://www.mind.ilstu.edu/curriculum/protothinker/natural_language_processing.php> accessed on Nov. 25, 2016, 24 pages.
Feldman, "NLP Meets the Jabberwocky: Natural Language Processing in Information Retrieval," Online, Information Today, Inc., Copyright May 1999, 16 pages.
Wilcox, B., "Beyond Façade: Pattern Matching for Natural Language Applications," The Gamasutra—The Art & Business of Making Games, Copyright 2016 UBM Tech, retrieved online: <http://gamasutra.com/view/feature/134765/beyond_fa%C3%A7ade_pattern_matching_.php> accessed on Nov. 25, 2016, 14 pages.
U.S. Appl. No. 13/842,735—Response to Feb. 20 Office Action filed Aug. 19, 2015, 15 pages.
U.S. Appl. No. 13/842,735—Office Action dated Nov. 10, 2016, 8 pages.
Bechet, F., et al., "Large Span statistical models: application to homophone disambiguation for large vocabulary speech recognition in French," Eurospeech, Sep. 1999, p. 1-4.
Choi, J., et al., "On applying phonological rules for a., Korean Continuous Speech Recognition System," Proceedings of ICSP '97, Aug. 1997, pp. 491-496.
Cremelie, et al., "In search of better pronounciation models for speech recognition," Speech Communication 29.2, Nov. 1999, pp. 115-136.
Derouault, A., et al., "Natural language modeling for phoneme-to-text transcription," IEEE Transactions on Pattern Analysis & Machine Intelligence, Nov. 6, 1986, pp. 742-749.
Gravier, G., et al., "Introducing contextual transcription rules in large vocabulary speech recognition," The Integration of Phonetic knowledge in speech technology, Spinger Netherlands, 2005, pp. 87-106.
Holter, T., et al., "Maximum likelihood modelling of pronounciation variation," Speech Communication 29.2, Nov. 1999, pp. 177-191.
Miller, L.G., et al., "Syntactic Analysis for large vocabulary speech recognition using a context-free covering grammar," Acoustics, Speech, and Signal processing, 1988, ICASSP—88, 1988 International Conference on. IEEE, Apr. 1988, pp. 271-274.
Schaden, S., "Rule-based lexical modelling of foreign-accented pronounciation variants," Proceedings of the tenth conference on European chapter of the Association of Computation Linguistics—vol. 2, Association for Computational Linguistics, 2003, pp. 159-162.
Schiel, F., et al., "Statistical modeling of pronunciation: it's not the model, it's the data," Modeling Pronounciation Variation for Automatic Speech Recognition, May 1998, pp. 1-7.
U.S. Appl. No. 14/634,642—Response to Mar. 23 Office Action filed May 17, 2016, 13 pages.
U.S. Appl. No. 14/634,642—Office Action dated Jul. 28, 2016, 27 pages.
U.S. Appl. No. 14/634,642—Response to Jul. 28 Office Action filed Sep. 15, 2016, 8 pages.
U.S. Appl. No. 13/843,290—Office Action dated Jan. 19, 2017, 7 pages.
U.S. Appl. No. 13/842,735—Notice of Allowance dated Jul. 13, 2016, 10 pages.
U.S. Appl. No. 13/842,735—Response to Office Action dated Nov. 10, 2016, filed May 8, 2017, 11 pages.
U.S. Appl. No. 13/842,735—Notice of Allowance dated Sep. 11, 2015, 10 pages.
U.S. Appl. No. 13/842,735—Notice of Allowance dated Jan. 7, 2016, 11 pages.
U.S. Appl. No. 13/842,735—Response to Notice of Allowance dated Jul. 13, 2016, filed Oct. 11, 2016, 14 pages.
U.S. Appl. No. 13/843,290—Notice of Allowance dated May 18, 2015, 5 pages.
U.S. Appl. No. 13/843,290—Notice of Allowance dated Aug. 3, 2015, 5 pages.
U.S. Appl. No. 13/843,290—Notice of Allowance dated Feb. 5, 2016, 5 pages.
Ranta, A., "Grammatical Framework: Programming with Multilingual Grammars," Slides for the GF book, CSLI Stanford, Copyright 2011, 440 pages.
Ranta, A., "Grammatical Framework Tutorial", Copyright Dec. 2010 for GF 3.2 [retrieved on Sep. 13, 2012], Retrieved from Internet: <http://www.grammaticalframework.org/doc/tutorial/gf-tutorial.html>. 68 pages.
"Grammatical Framework" Version 3.3.3, Copyright Mar. 2012 [retrieved on Sep. 23, 2012], Retrieved from Internet: <http://www.grammaticalframework.org>. 4 pages.
VoiceXML Tutorial (NUANCE), BeVocal, Inc., Mountain View, CA, Copyright 2005, 68 pages.
JavaScript Quick Reference, BeVocal Inc. (NUANCE), Mountain View, CA, Copyright 2005, 24 pages.
Grammar Reference, BeVocal, Inc. (NUANCE), Mountain View, CA, Copyright 2005, 102 pages.
Ranta, A., "Creating Linguistic Resources with the Grammatical Framewor," LREC Tutorial, Malta, May 17, 2010, 75 pages.
Conway, D., et al., "Synopsis 5: Regexes and Rules", Version 158, Created Jun. 24, 2002 and Last Modified Jul. 31, 2012 [retrieved Sep. 26, 2012], Retrieved from Internet: <http://perlcabal.org/syn/s05.html>, 65 pages.

(56) References Cited

OTHER PUBLICATIONS

Grammar's Developers Guide, Nuance Speech Recognition System, Version 8.5, Copyright 2003 Nuance Communications Inc., Menlo Park, CA, 262 pages.
Wang, A.L., "An Industrial-Strength Audio Search Algorithm," In ISMIR 2003, 4th Symposium Conference on Music Information Retrieval(Oct. 26, 2003), pp. 7-13.
Venkatachalam, V., Cazzanti, L., Chillon, N., Wells, M., "Automatic Identification of Sound Recordings," Signal Processing Magazine, IEEE, Mar. 2004, 92-99, vol. 21, Issue 2.
Nelson, J., V Cast Song ID from Verizon Wireless. May 21, 2007 [retrieved on Jul. 24, 2014], Retrieved from Internet: <http://www.verizonwireless.com/news/article/2007/05/pr2007-05-21a.html>.
Gracenote: MusicID, available at http://www.gracenote.com/business.sub.--solutions/music.sub.--id/, last accessed Aug. 4, 2010.
Shazam: http://web.archive.org/web/20100501190631/http://www.shazam.com/. Last accessed May 1, 2010.
App Shopper Shazam: http://appshopper.com/music/shazam. Last changed Jul. 24, 2014.
Gracenote Mobile MusicID: http://web.archive.org/web/20100123211802/http://www.gracenote.com/busine- ss.sub.-solutions/mobileMusic/. Last accessed Jan. 23, 2010.
App Shopper MusicID: http://appshopper.com/music/musicid. Last changed Jul. 14, 2014.
Xu, et al. "Music Identification via Vocabulary Tree with MFCC Peaks," MIRUM '11 Proceedings of the 1st international ACM workshop on Music information retrieval with user-centered and multimodal strategies, 2011. p. 21-26.http://dl.acm.org/citation.cfm?doid=2072529.2072537.
Li, et al. "Robust Audio Identification for MP3 Popular Music," SIGIR '10 Proceedings of the 33rd international ACM SIGIR conference on Research and development in information retrieval, Jul. 2010. p. 627-634.http://dLacm.org/citation.cfm?doid=1835449.1835554.
Yu, et al. "A Query-by-Singing System for Retrieving Karaoke Music," IEEE Transactions on Multimedia, Dec. 2008, vol. 10, No. 8, p. 1626-1637. http://ieeexplore.ieee.org/xpl/articleDetails.jsp?arnumber=4694852.
Liu, et al. "Content-Based Retrieval of MP3 Music Objects," CIKM '01 Proceedings of the tenth international conference on Information and knowledge management, 2001. p. 506-511. http://dx.doi.org/10.1145/502585.502670.
OMRAS2—Ontology-Driven Music Retrieval & Annotation Sharing Service. Overview—Apr. 24, 2009 [Accessed Jul. 24, 2014—Archive.org] http://web.archive.org/web/20090424083019/http://www.omras2.org/overview. 2 pages.
OMRAS2—AudioDB-Populating and Querying an AudioDB Instance. (No archived version available—accessed Jul. 24, 2014 via Google) http://omras2.org/audioDB/tutorial1. 3 pages.
Benson, et al. "Sync Kit: A Persistent Client-Side Database Caching Toolkit for Data Intensive Websites," Proceedings of the 19th International Conference on Worid Wide Web, Apr. 2010. pp. 121-130. http://dl.acm.org/citation.cfm?id=1772704. cited byapplicant.
Larson, et al. "NYT to Release Thesaurus and Enter Linked Data Cloud," NY Times Blogs, Jun. 2009. http://open.blogs.nytimes.com/2009/06/26/nyt-to-release-thesaurus-and-ent- erlinked-data-cloud/.
"Aurix Enhances Effectiveness of Leading Search Software," Aurix.com—News. Jun. 1, 2010. http://www.aurix.com/pages/3808/Aurix.sub.-enhances.sub.--effectiveness.- sub.-of.sub.--leading.sub.-search.sub.-software.htm.
"Hearing it Loud & Clear at SpeechTEK 2010," Aurix.com—News. Jul. 21, 2010, http://www.aurix.com/pages/4161/State.sub.-of.sub.--the.sub.--art.sub.--speech.sub.-technology.htm.
Jamil, "A Natural Language Interface Plug-In for Cooperative Query Answering in Biological Databases," BMC Genomics, Nov. 2011. (Accessed Sep. 27, 2012 via SpringerLink) http://www.biomedcentral.com/1471-2164/13/S3/S4.
Feng, "A General Framework for Building Natural Language Understanding Modules in Voice Search," 2010 IEEE International Conference on Acoustics Speech and Signal Processing (ICASSP), Mar. 2010. (Accessed Jul. 24, 2014—IEEE)http://ieeexplore.ieee.org/xpl/articleDetails.jsp?arnumber=5494951.
Langanke, "Direct Voice Control Speech Data Entry and Database Query Models," International Symposium on Logistics and Industrial Informatics, Sep. 2007. (Accessed Jul. 24, 2014—IEEE)http://ieeexplore.ieee.org/xpl/articleDetails.jsp?arnumber=4343522.
Indukuri, et al. "Natural Language Querying Over Databases Using Cascaded CRFs," Lecture Notes in Computer Science, Sep. 2010, http://www.springerlink.com/content/5w1x27650475304m.
Kolias, et al. "Design and implementation of a VoiceXML-driven wiki application for assistive environments on the web," Personal and Ubiquitous Computing, Sep. 2010. vol. 14, No. 6, p. 527-539,http://www.icsd.aegean.gr/publication.sub.-files/journal/295233664.pdf.
PCT/US2013/042097—International Search Report & Written Opinion dated Dec. 2, 2013.
ATT, "Conversant VIS Version 4.0 Whole Word Bilignual Speech Recognition", Issue 1, Oct. 1993, 86 pgs.
"Contact Center Business Planning Guide", Avaya Inc., 2010, 8 pgs.
"Avaya Self-Service Optimization. Optimize the Performace of your Avaya Self-Service applications", Avaya, Inc., 2011, 4 pgs.
"VoiceXML Tutorial. Developer documentation", Bevocal, Inc., 2005, 68 pgs.
Brick, T, et al. "Incremental Natural Language Parsing for HRI", Journal of the Association for Computing Machinery, Mar. 10-12, 2007, 8 pgs.
Charniak, E., et al. "Edge-Based Best-First Chart Parsing", 1998, 8 pgs.
Crisostomo, A. "Constituents and Phrases", Jul. 2011, 43 pgs.
Copestake, A, et al., "Minimal Recursion Semantics: An Introduction" Research on Language and Computation, vol. 3, pp. 281-332, 2005.
Deobhakta, N., "Natural Language Processing, User Interfaces, and the Semantic Web". Proceedings from the Third Annual HCI Symposium, Dec. 2012, 22 pgs.
"ECMAScript Language Specification", ECMA-262, ECMA International, 5.1 Edition, Jun. 2011, 258 pgs.
Graham, P., "Parsing with ATNs. On Lisp: Advanced Techniques for Common Lisp", Engelwood Cliffs, NJ, Prentice Hall, 1993, 16 pgs.
McKeown, K., "Semantic Analysis: Syntax-Driven Semantics", 27 pgs. [retrieved Jun. 17, 2014]. Retrieved from the Internet: <URL: <http://www.google.com/url?sa=t&rct=j&q=&esrc=s&source=web&cd=2&ved=0CCEQFjAB&url=http%3A%2F%2Fwww1.cs.columbia.edu%2F~kathy%2FNLP%2FClassSlides%2FClass13SemanticAnalysis%2Fsemantics.ppt&ei=Xdb4VMPDIcvsoAS2soGABg&usg=AFQjCNGiXuBWLO-oQB_MLor_kN_8ATdpRg&sig2=BnvJvvJJo3OApAC6ny0guQ&bvm=bv.87611401,d.cGU>>.
Huang, L, et al., "Dynamic Programming for Linear-Time Incremental Parsing". Proceedings of the 48th Annual Meeting of the Association for Computational Linguistics, pp. 1077-1086, Jul. 2010.
Iqbal, R, et al., "A Negation Query Engine for Complex Query Transformations". Journal of Science and Technology, pp. 193-204, 2013.
Klein, D, et al. "Accurate Unlexicalized Parsing", Proceedings of the 41st Meeting of the Association for Computational Linguistics, vol. 1, pp. 423-430, 2003.
Matsubara, S, et al., "Chart-based Parsing and Transfer in Incremental Spoken Language Translation", Proceedings of the Fourth Natural Language Processing Pacific Rim Symposium, 1997, 4 pgs.
Mohri, M, et al., "Weighted Finite-State Transducers in Speech Recognition", Computer Speech and Language, Jan. 2002, 26 pgs.
Jurafsky et al., Speech and Language Processing: An Introduction to Natural Language Processing, Computational Linguistics and Speech Recognition, 3rd edition draft dated Sep. 21, 2021, 629 pages. Retrieved on Nov. 4, 2021. Retrieved from the internet [URL: https://web.stanford.edu/~jurafsky/slp3/ed3book_sep212021.pdf ].

* cited by examiner

| Returns | | Weighted Rule |
|---|---|---|
| 123456 | "N First Street" | ( [10 "north"] . "first" . [50 ("street"|(1/10 ("avenue"|"road")))]) \| (1/5 "first" . [50 ("street"|(1/10 ("avenue"|"road")))] . "north") ) . [1/10 "in"] . "san jose" . ["california"|0.01 "c. a."] |
| 123457 | "1st Avenue" | ("first" . [50 ("avenue"|(1/10 ("street"|"road")))]) . [1/10 "in"] . "san jose" . ["california"|0.01 "c. a."] ] |
| 123458 | "21st Avenue" | ("twenty first" . [50 ("avenue"|(1/10 ("street"|"road")))]) [1/10 "in"] . "san jose" . ["california"|0.01 "c. a."] |

FIG. 7A

Weighting of Rule 123456

```
1 23         3         3   4         5   6                65432           723
( ([10 "north"] . "first" . [50 ("street"|(1/10 ("avenue"|"road")))]) |
{5|1 next line} 10/11    50/51  {10 | 1}

2         3   4         5   6                6543      2 1              725
(1/5 "first" . [50 ("street"|(1/10 ("avenue"|"road")))] . "north") )
{5 above | 1} 50/51   {10| 1}
                                                                          727
   1         1          1                         1
. [1/10 "in"] . "san jose" . ["california"|0.01 "c. a."]
  1/11                           {100 |    1 }
```

FIG. 7B

Scoring of Token String "north first street san jose" Against Rule 123456

```
1 2        3        3     3   4        5   6                65432        733
( (          [10 "north"] . "first" . [50 ("street"|(1/10 ("avenue"|"road")))]) |
{1/(1+1/5)} {10/11}       {1}    {50/51} {1/1+1/10)}
                                                                         735
  2        3   4       5   6                6543      2 1
(1/5 "first" . [50 ("street"|(1/10 ("avenue"|"road")))] . "north") )
{n/a because first half of disjunction satisfied}

1        1         1                         1        737
. [1/10 "in"] . "san jose" . ["california"|0.01 "c. a."]
  {1/((1/10)+1)}         {1 / 2 omission}
```

FIG. 7C

Scoring of Token String "first street north san jose" Against Rule 123456

⎯ 743

```
1 2          3           3         3 4        5       6                65432
( (          [10 "north"] . "first" . [50 ("street"|(1/10 ("avenue"|"road"))))]) |
{n/a because first half of disjunction satisfied}
```

⎯ 745

```
2                3  4        5       6                 6543         2 1
(1/5 "first" .   [50 ("street"|(1/10 ("avenue"|"road")))] . "north") )
{(1/5)/(1+1/5)}} {50/51} {1/(1+1/10)}                                {1}
```

⎯ 737

```
   1                  1             1                      1
. [1/10 "in"] . "san jose" . ["california"|0.01 "c. a."]
  {(1/10)/(1+1/10)}            {1 / 2 for omission}
```

FIG. 7D

Scoring of Token String "first street san jose california" Against Rule 123456

⎯ 753

```
1 2          3           3         3 4        5       6                65432
( (          [10 "north"] . "first" . [50 ("street"|(1/10 ("avenue"|"road"))))]) |
{1/(1+1/5)}  {1/11}            {1}    {50/51} {1/(1+1/10)}
```

⎯ 755

```
2                3  4        5       6                 6543         2 1
(1/5 "first" .   [50 ("street"|(1/10 ("avenue"|"road")))] . "north") )
{n/a because first half of disjunction satisfied}
```

⎯ 757

```
   1                  1             1                              1
. [1/10 "in"] . "san jose" . ["california"    |    0.01 "c. a."]
  {1/((1/10)+1)}              {1/2 for present} {1 / 1.01}
```

FIG. 7E

```
abstract Calculator = {
flags startcat = Exp ;
cat Exp ;
fun
  EPlus, EMinus, ETimes, EDiv : Exp -> Exp -> Exp ;
  EInt : Int -> Exp ;
}
concrete CalculatorC of Calculator = open Formal, Prelude in {
lincat
  Exp = TermPrec ;
lin
  EPlus  = infixl 0 "+" ;
  EMinus = infixl 0 "-" ;
  ETimes = infixl 1 "*" ;
  EDiv   = infixl 1 "/" ;
  EInt i = constant i.s ;
}
concrete CalculatorJ of Calculator = open Prelude in {
lincat
  Exp = SS ;
lin
  EPlus  = postfix "iadd" ;
  EMinus = postfix "isub" ;
  ETimes = postfix "imul" ;
  EDiv   = postfix "idiv" ;
  EInt i = ss ("ldc" ++ i.s) ;
oper
  postfix : Str -> SS -> SS -> SS = \op,x,y ->
    ss (x.s ++ ";" ++ y.s ++ ";" ++ op) ;
}
concrete CalculatorP of Calculator = open Prelude in {
lincat
  Exp = SS ;
lin
  EPlus  = infix "+" ;
  EMinus = infix "-" ;
  ETimes = infix "*" ;
  EDiv   = infix "/" ;
  EInt i = i ;
oper
  infix : Str -> SS -> SS -> SS = \f,x,y ->
    ss ("(" ++ x.s ++ f ++ y.s ++ ")") ;
}
concrete CalculatorS of Calculator = open Prelude in {
  lin
    EPlus  = infix "plus" ;
    EMinus = infix "minus" ;
    ETimes = infix "times" ;
    EDiv   = infix ["divided by"] ;
    EInt i = i ;
  oper
    infix : Str -> SS -> SS -> SS = \op,x,y ->
      ss (x.s ++ op ++ y.s ++ "PAUSE") ;
}
```

- Abstract 811
- Concrete 812
- Concrete 813
- 814
- 815
- 816

FIG. 8

Prior art GF language from Grammatical Framework.org

```
[includes, namespace, etc.]

enum arith_infix_ops {                              ← Enums
    ADD_OP,                                           911
    SUB_OP,
    MUL_OP,
    PERCENT_OP,
    DIV_OP,
    PWR_OP,
                                                    ← Block
    MINUS_OP   // this unary op is listed with binary ops    912
};
// ARITH_QUERY() is the top level block for arithmetic queries.
public block (string response, ArithFormula *formula, string valueStr) ARITH_QUERY()
{
    interpret { ARITH_WHAT() . x = ARITH_EXPR()} as
    {
            string text = "";                       ← Interpret
            NumberToText(x->value, text);              913
            response = text;
        formula = x->formula;
            char buffer[100];
            sprintf(buffer, "%g", x->value);
            valueStr += buffer;
    } interpret { x = ARITH_CMDS()} as
    {
            string text = "";
            NumberToText(x->value, text);           ← Interpret
            response = text;                           914
        formula = x->formula;
            char buffer[100];
            sprintf(buffer, "%g", x->value);
            valueStr += buffer;
    }
}                                           ← Block
public block () ARITH_WHAT()                   915
{                                                   ← Interpret
    interpret { ["tell me"] . [("what is"|"what's")] } as {    916
    }
}
                                                    ← Block
// block ARITH_EXPR delegates to ARITH_INFIX() and ARITH_PREFIX    917
public block (double value, ArithFormula *formula) ARITH_EXPR()
{
    interpret { x = ARITH_PREFIX() } as {
        value = x->value;
        formula = x->formula;                       ← Interpret
    }                                                  918
    interpret { x = ARITH_INFIX() } as {
        value = x->value;
        formula = x->formula;                       ← Interpret
    }                                                  919
}
```

FIG. 9A

```
// block ARITH_INFIX is a prefix expression followed
// by any positive number of infix operator-operand pairs
public block (double value, ArithFormula *formula) ARITH_INFIX()
{
    interpret {x1=ARITH_PREFIX() . x2=(ARITH_INFIX_TAIL())+} as {
        value = x1->value;
        formula = x1->formula;

for (int i=0; i<x2_length; i++)
        {
            int op = x2[i].op;
            if (op == ADD_OP) {
                value += x2[i].value;
                formula = ArithFormula::wrap_add(f1, x2[i].formula);
            } else if (op == SUB_OP) {
                value -= x2[i].value;
                formula = ArithFormula::wrap_sub(f1, x2[i].formula);
            } else if (op == MUL_OP) {
                value *= x2[i].value;
                formula = ArithFormula::wrap_mul(f1, x2[i].formula);
            } else if (op == PERCENT_OP) {
                value *= x2[i].value/100.0;
                ArithFormula *f2 = ArithFormula::wrap_div(f1, ArithFormula::wrap_int(100));
                formula = ArithFormula::wrap_mul(x2[i].formula, f2);
            } else if (op == DIV_OP) {
                value /= x2[i].value;  // NAN value is OK
                formula = ArithFormula::wrap_div(f1, x2[i].formula);
            } else if (op == PWR_OP) {
                value = pow(value, x2[i].value);
                formula = ArithFormula::wrap_pow(f1, x2[i].formula);
} } } }
public block (int op, double value, ArithFormula *formula) ARITH_INFIX_TAIL()
{
    interpret { "plus" . x = ARITH_PREFIX() } as {
        op = ADD_OP;
        value = x->value;
        formula = x->formula;
    }
    interpret { "minus" . x = ARITH_PREFIX() } as {
        op = SUB_OP;
        value = x->value;
        formula = x->formula;
    }
    interpret { ("times" | "multiplied by") . x = ARITH_PREFIX() } as {
        op = MUL_OP;
        value = x->value;
        formula = x->formula;
    }
    interpret { ("percent of") . x = ARITH_PREFIX() } as {
        op = PERCENT_OP;
        value = x->value;
        formula = x->formula;
    }
```

FIG. 9B

```
    interpret { "divided by" . x = ARITH_PREFIX() } as {
        op = DIV_OP;
        value = x->value;
        formula = x->formula;
    }
    interpret { "to the" . ["power" . ["of"]] . x = ARITH_PREFIX() } as {
        op = PWR_OP;
        value = x->value;
        formula = x->formula;
    }
}
// Block ARITH_PREFIX acts atomically as a parenthesised expression
// We distinguish multiple types: plain integer,
// unary prefix expr, binary prefix expr, n-ary prefix expr
// (also we may add postfix expressions, e.g. X square)
public block (double value, ArithFormula *formula) ARITH_PREFIX()
{
    // decimal numbers (includes the case of plain integers)
    interpret { x = DECIMAL_NUM() } as {
        value = ((double)x->num) / (double)x->denom;
        //fprintf(stderr, "read decimal %ld / %ld = %g/%g = %g\n",
        //         x->num, x->denom, (double)x->num, (double)x->denom, value);
        formula = ArithFormula::wrap_rational(x->num, x->denom);
        //formula = ArithFormula::wrap_decimal(value);
    }

// unary prefix
    interpret { x = ARITH_PREFIX_UNARY() } as {
        value = x->value;
        formula = x->formula;
    }

// binary prefix
    interpret { x = ARITH_PREFIX_BINARY() } as {
        value = x->value;
        formula = x->formula;
    }

// n-ary prefix
    interpret { x = ARITH_PREFIX_NARY() } as {
        value = x->value;
        formula = x->formula;
    }
}
public block () OPEN_PAREN()
{
    interpret { "open" . ["parenthesis" | "parenn"] } as {}
} public block () CLOSE_PAREN()
{
    interpret { "close" . ["parenthesis" | "parenn"] } as {}
}
```

Block 932

FIG. 9C

```
// Block ARITH_PREFIX_UNARY handles
// open <expression> close; inverse; minus; the square of X
// the square root of Y; the cube of Z; the cubic root of Z
public block (double value, ArithFormula *formula) ARITH_PREFIX_UNARY()
{
    interpret { OPEN_PAREN() . x = ARITH_EXPR() . CLOSE_PAREN() } as {
        value = x->value;
        formula = x->formula;
    } interpret { "the quantity" . x = ARITH_EXPR() } as {
        // NOTE: use of ARITH_EXPR introduces grammatical ambiguity
        // but allows a more colloquial form of parentheses
        value = x->value;
        formula = x->formula;
    } interpret { "minus" . x = ARITH_EXPR() } as {
        value = - x->value;
        formula = ArithFormula::wrap_minus(x->formula);
    } interpret { "the inverse of" . x = ARITH_EXPR() } as {
        value = 1 / x->value;
        formula = ArithFormula::wrap_div(ArithFormula::wrap_int(1), x->formula);
    } interpret { "the square of" . x = ARITH_EXPR() } as {
        value = x->value * x->value;
        formula = ArithFormula::wrap_pow(x->formula, ArithFormula::wrap_int(2));
    } interpret { "the square root of" . x = ARITH_EXPR() } as {
        value = sqrt(x->value);
        formula = ArithFormula::wrap_pow(x->formula,
            ArithFormula::wrap_div(ArithFormula::wrap_int(1), ArithFormula::wrap_int(2)));
    } interpret { "the cube of" . x = ARITH_EXPR() } as {
        value = pow(x->value, 3);
        formula = ArithFormula::wrap_pow(x->formula, ArithFormula::wrap_int(3));
    } interpret { "the cubic root of" . x = ARITH_EXPR() } as {
        value = pow(x->value, 1.0/3.0);
        formula = ArithFormula::wrap_pow(x->formula,
            ArithFormula::wrap_div(ArithFormula::wrap_int(1), ArithFormula::wrap_int(3)));
    } interpret { "the absolute value of" . x = ARITH_EXPR() } as {
        value = (x->value < 0.0) ? -x->value : x->value;
        formula = ArithFormula::wrap_abs(x->formula);
    }
} }
```

FIG. 9D

```
#include "TimeUtility.h"
#include "DayOfWeek.ter"         ⟵ Includes
#include "DayOfMonth.ter"            1011
#include "DayOfMonthOrdinal.ter"
#include "Month.ter"
#include "Year.ter"          ⟵ Block
                                1012
public block (
  int mday_index = -1,
  int wday_index = -1,
  int month_index = -1,
  int year_index = -1,
  int month_index_implicit=0,
  int year_index_implicit=0,
  int week_delay=0,
  int pm_hint = 0)
DATE ()                      ⟵ Exclude
{                               1013
  // This is not a date. It is a recurring date.
  exclude {"every" . ["other"] . (DAY_OF_WEEK() | DAY_OF_MONTH_ORDINAL())} interpret {"today" | "this" . ("morning" | n1=("evening" | "afternoon" | "night")) |
    n2=("tonight" | "to"."night") } as
  {                                                   ⟵ Interpret
    mday_index = now->day_of_month() + 1;                1014
    month_index = now->month();
    year_index = now->year();
    if (n1 || n2) pm_hint=1;
  };                                                  ⟵ Interpret
                                                         1015
  interpret {"tomorrow" . ["morning" | n=("evening" | "afternoon" | "night")]} as
  {
    increment_date(mday_index, month_index, year_index,
      now->day_of_month() + 1, now->month(), now->year(), 1, (UnitsOfDate)0);
    if (n) pm_hint = 1;
  };                                                  ⟵ Interpret
                                                         1016
  interpret {["the"] . "day" . "after" . "tomorrow"} as
  {
    increment_date(mday_index, month_index, year_index,
      now->day_of_month() + 1, now->month(), now->year(), 2 , (UnitsOfDate)0);
  };
```

FIG. 10A

```
                         Weight                          Interpret
                          1022                             1021
interpret {([n1=DAY_OF_WEEK().(1/8)("morning" |
     n5=("evening" | "afternoon" | "night"))]] .
     n2=MONTH() . ["on"] . n3=DAY_OF_MONTH() . [n4=YEAR()])} as
{
  mday_index = n3->mday_index;
  if (n2) {
    month_index = n2->month_index;
  } else if (now->day_of_month() + 1 < mday_index) {
    month_index = now->month();
    month_index_implicit=1;
  } else {
    month_index = (now->month() + 1) % 12;
    month_index_implicit=1;
  }
  if (n4) {
    year_index = n4->year_index;
  } else if (now->day_of_month() + 1 + now->month() * 100 <= mday_index +
    month_index * 100) {
    year_index = now->year();
    year_index_implicit=1;
  } else {
    year_index = now->year() + 1;
    year_index_implicit=1;
  }
  if (n5) pm_hint=1;
};                       Weight                          Interpret
                          1027                             1026
interpret {([n1=DAY_OF_WEEK().(1/8)("morning" | n5=("evening" | "afternoon" |
    "night"))]] . n3=DAY_OF_MONTH_ORDINAL())} as
{
  mday_index = n3->mday_index;
  if (now->day_of_month() + 1 < mday_index) {
    month_index = now->month();
    month_index_implicit=1;
  } else {
    month_index = (now->month() + 1) % 12;
    month_index_implicit=1;
  }
  if (now->day_of_month() + 1 + now->month() * 100 <= mday_index + month_index *
100) {
    year_index = now->year();
    year_index_implicit=1;
  } else {
    year_index = now->year() + 1;
    year_index_implicit=1;
  }
  if (n5) pm_hint=1;
};
```

FIG. 10B

```
                      Weight ──┐                      ┌── Interpret
                        1032   │                      │   1031
interpret { n1=DAY_OF_WEEK() .([1/8]("morning" | n3=("night"|"evening"|"afternoon"))]
  . "of" . n2=("next" | "this") . "week" } as
{
  wday_index = n1->wday_index;
  week_delay = (*n2 == "next")?1:0;
  year_index = 0;
  if (n3) pm_hint=1;
}                                    Weight ──┐              ┌── Interpret
                                       1034   │              │   1033
interpret {n1=DAY_OF_MONTH_ORDINAL() . "of" . (2^-10)"the month of"] . n2=MONTH()
  . [n4=YEAR()]} as
{
  mday_index = n1->mday_index;
  month_index = n2->month_index;
  if (n4) {
    year_index = n4->year_index;
  } else if (now->day_of_month() + 1 + now->month() * 100 <= mday_index +
month_index * 100) {
    year_index = now->year();
    year_index_implicit = 1;
  } else {
    year_index = now->year() + 1;
    year_index_implicit=1;
  }
};        ┌── Weight
          │   1037                                           ┌── Interpret
interpret { n1=(["this" | "next"]) . n2=DAY_OF_WEEK() .      │   1036
  ([1/8]("morning" | n3=("evening" | "afternoon" | "night"))]} as
{
  // We will delay the decision of converting wday to date until the
  // very end to use context; for example "saturday to friday" will result in
  // a different date for friday than "friday to saturday"
  // The following formula can be used: (mday_index,month_index,year_index)=
  // date_from_wday(base_mday_index, base_month_index, base_year_index,
  // wday_index, week_delay)
  wday_index=n2->wday_index;
  week_delay = 0;
  if (n1 && *n1 == "next") { week_delay=1; }
  if (n3) pm_hint=1;
  year_index = 0;
};
}
```

```
public block (LocationSpec location) NEARBY_LOCATION(){
    interpret {["show"] . n=LOCATION()} as {
        location=n->location;
        float distance =
calculate_distance(location.lat,location.lon,current_location.lat,current_location.lon
)/*code to calculate the distance between the user and the destination*/
        if (distance > 100)
        {
            excludethis(); /*if distance is more than 100 miles exclude this parse. The
excludethis() statement is equivalent to setting the weight to 0*/
        }else{
            weight=weight/(1+distance); /*penalize the weight by the distance from the
user*/
        }
    }
}
```

FIG. 12

```
table (string title, string artist) SONG_TITLE()[
    [["I Just Called to Say I Love You","Stevie Wonder"] 0.010 "i just called to say i
love you" . [["by"] . "stevie wonder"]],
    [["I Just Called to Say I Love You","Richard Clayderman"] 0.005 "i just called to
say i love you" . [["by"] . "richard clayderman"]],
    [["I Just Called to Say I Love You","Herbie Hancock"] 0.001 "i just called to say i
love you" . [["by"] . "herbie hancock"]],
    /*etc.*/
]
```

BUILDING A NATURAL LANGUAGE UNDERSTANDING APPLICATION USING A RECEIVED ELECTRONIC RECORD CONTAINING PROGRAMMING CODE INCLUDING AN INTERPRET-BLOCK, AN INTERPRET-STATEMENT, A PATTERN EXPRESSION AND AN ACTION STATEMENT

RELATED APPLICATIONS

This application is a continuation of U.S. application Ser. No. 16/209,854, titled "INTEGRATED PROGRAMMING FRAMEWORK FOR SPEECH AND TEXT UNDERSTANDING WITH BLOCK AND STATEMENT STRUCTURE", filed Dec. 4, 2018, which is a continuation of Ser. No. 13/843,290, titled "INTEGRATED PROGRAMMING FRAMEWORK FOR SPEECH AND TEXT UNDERSTANDING WITH BLOCK AND STATEMENT STRUCTURE", filed 15 Mar. 2013, which is related to and claims the benefit of U.S. Provisional Application No. 61/798,526 filed on Mar. 15, 2013, entitled "AN INTEGRATED PROGRAMMING FRAMEWORK FOR SPEECH AND TEXT UNDERSTANDING", and U.S. Provisional Application No. 61/674,833 filed on Jul. 23, 2012, entitled "Terrier: An Integrated Programming Framework for Speech and Text Understanding". The provisional applications are hereby incorporated by reference.

This application is further related to U.S. application Ser. No. 13/480,400 filed on May 24, 2012, now U.S. Pat. No. 8,694,537, issued Apr. 8, 2014, entitled "SYSTEMS AND METHODS FOR ENABLING NATURAL LANGUAGE PROCESSING", which is hereby incorporated by reference.

BACKGROUND

The technology disclosed relates to natural language understanding (NLU) and to analysis of meaning of text and spoken phrases. In particular, it relates to new programming constructs and tools and processing patterns that implement those new programming constructs.

Conventional programming for natural language understanding is arcane and requires great expertise, as shown by FIG. 8. This figure is part of a simple calculator example written in the grammar definition language known as Grammatical Framework ("GF"). An abstract syntax 811 provides a foundation for a concrete syntax 812, 813, as explained in Aarne Ranta, Grammatical Framework: Programming with Multilingual Grammars, Chapter 8 (2011). Obscure functions including lincat 814, lin 815, and oper 816 are part of GF's expression of parsing input. Many layers of special purpose programming and linguistic expertise are required of those who program vertical applications using NLU programming approaches such as GF.

Other grammar-based NLU frameworks, such as those by Nuance, are built around defining a fixed set of slots that represent the expected information supplied in utterances within a vertical application and determining how each phrase in the grammar results in filling those slots. See, e.g., Grammar Developer's Guide, Nuance Speech Recognition System Version 8.5, Chapter 4 (2003). Use of grammar slots is consistent with the W3C standard known as Voice XML. See, e.g., Scott McGlashan et al., Voice Extensible Markup Language (VoiceXML) 3.0, section 6.10 Field Module, Table 41 (8th Working Draft December 2010). Version 2.0 of the VoiceXML recommendation has been implemented in BeVocal's Nuance Café, with grammar slots. See, BeVocal, VoiceXML Tutorial, p. 49 Grammar Slots (2005); BeVocal, VoiceXML Programmer's Guide (2005); BeVocal, Grammar Reference (2005). Like GF, VoiceXML involves multiple layers of abstraction and special expertise. In this context, a vertical application or vertical market application, is software defined by requirements for a single or narrowly defined market. It contrasts with horizontal application. An example provided by Wikipedia of a vertical application is software that helps doctors manage patient records, insurance billing, etc. Software like this can be purchased off-the-shelf and used as-is, or the doctor can hire a consultant to modify the software to accommodate the needs of the doctor. The software is specifically designed to be used by any doctor's office, but would not be useful to other businesses.

Custom applications of NLU have gained momentum with the introduction of Apple's Siri voice recognition on the iPhone 4S. However, at this time, the API to Siri is not publically released.

An opportunity arises to introduce authoring technology for custom applications of natural language understanding. More efficient, reliable, updatable and maintainable custom applications may result. More custom applications may be produced, as barriers to entry for authors are lowered. Sharing of NLU blocks that understand common semantic units that are frequently used, such as dates, times, location, phone numbers, email address, URLs, search queries, etc. can be expected as the pool of NLU authors expands greatly. Improved user interfaces may ultimately be produced.

SUMMARY

The technology disclosed relates to authoring of vertical applications of natural language understanding (NLU), which analyze text or utterances and construct their meaning. In particular, it relates to new programming constructs and tools and data structures implementing those new applications. Other aspects and advantages of the technology disclosed can be seen on review of the drawings, the detailed description and the claims, which follow.

BRIEF DESCRIPTION OF THE DRAWINGS

FIG. 7 includes FIGS. 7A-7E. FIG. 7A shows a table with three weighted patterns. FIG. 7B explains normalized weighting of pattern 123456. FIGS. 7C-7E score three token phrases against the same pattern 123456.

FIG. 8 is a prior art example of programming natural language understanding using the Grammatical Framework language to describe abstract and concrete descriptions of a calculator.

FIGS. 9A-9D (collectively FIG. 9) are excerpts from the code of a NLU vertical application that understands prefix and infix requests to a calculator and performs the requested calculations; they illustrate interpret blocks and interpret statements.

FIGS. 10A-10C (collectively FIG. 10) are excerpts from the code of a NLU application that handles dates.

FIG. 11 is an example of action statements that sets a returned weight.

FIG. 12 is a sample table block that represents song titles.

DETAILED DESCRIPTION

Figure 1:
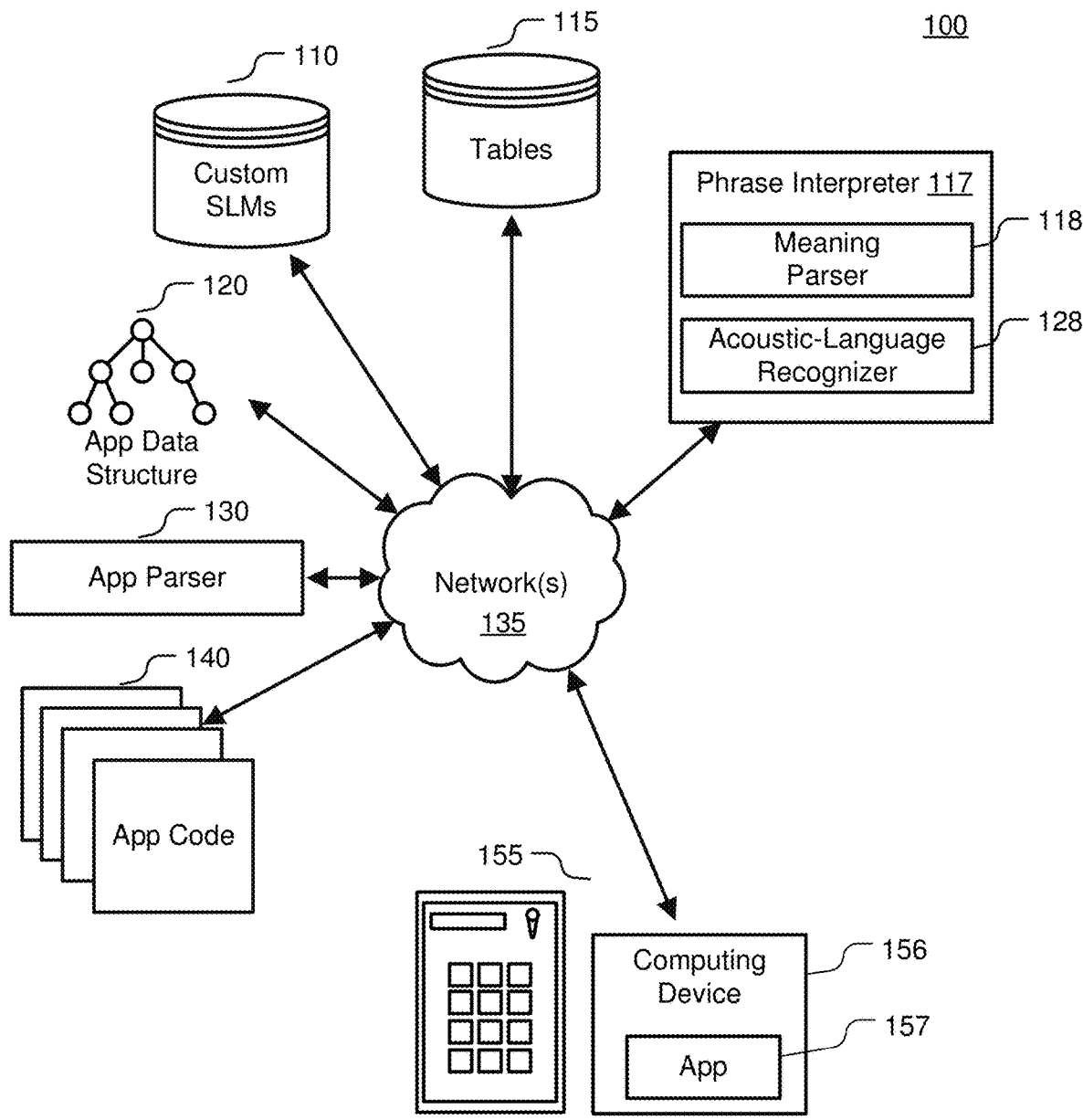
FIG. 1 is a high-level block diagram of a method and system that can be used to implement the technology disclosed.

A detailed description of implementations of the technology disclosed is provided with reference to the FIGS. 1-12.

In state of the art implementations of systems that utilize speech recognition and natural language processing, speech recognition is typically applied first to produce a sequence of words or a set of hypotheses. Sometimes, this speech recognition is referred to as a combination of acoustic recognition and language, or linguistic, recognition. Speech recognition output is sent to the NLU system to extract the meaning. The weakness of such a system is that errors in the speech recognition output can cause the NLU system to misunderstand the intended meaning. To quantify how severe this problem may be, consider the example of a speech recognition system that has ninety percent word accuracy. This system could have zero percent sentence accuracy for a large number of sentences, such as sentences that are 10 words long, with one word being wrong in each sentence. Incorrect sentences can have the wrong meaning or no meaning at all from the point of view of a NLU system.

The technology disclosed includes an integrated approach that decodes both speech and meaning concurrently. If at any time interval, a partial hypothesis is not a prefix of a parsable phrase, it can be eliminated or pruned from a set of token recognition hypotheses for the speech recognition. For those hypotheses that are parsable prefixes, the partial score of the parse can be accumulated, influencing the more likely phrases from a meaning parser's perspective to have a higher score for speech recognition. This approach increases accuracy by eliminating meaningless phrases and by promoting more likely phrases. This approach also improves latency. Response time decreases due to the fact that both steps are executed concurrently as opposed to sequentially.

The technology disclosed applies the run time meaning parser to new programming constructs that extend a programming language, such as a general-purpose programming language, using the interpret blocks and interpret statements. The interpret blocks process token lists (or phrases), produce scores for pattern matches and incomplete pattern matches, and return meanings associated with completed pattern matches. The interpret statements identify meaningful patterns that can be constructed from one or more words in a natural language, extended pattern tables, custom statistical language models and other interpret blocks. Interpret blocks also link interpret statements with action statements written in the general-purpose programming language which can be invoked by a completed pattern match to perform actions programmed using the power of the general-purpose programming language.

Introductory Example Using Extended Pattern Tables

Before turning to the figures, it is useful to consider an example that introduces the subtlety and depth of language understanding problems and the power of the technology disclosed to solve many such problems. The first example, which is further discussed below in the context of FIG. 7, involves recognition of street addresses. This example illustrates defining patterns to process a token string that ambiguously expresses a street address. By ambiguously expressed, we mean that the same token string may match multiple patterns and may have multiple meanings, as in the following example. The patterns that the token string may match are expressed using interpret blocks and statements, extended pattern tables and action statements. The goal of this example is to be able to detect and parse street addresses and validate them by performing some logic.

Imagine the user inputting the query, "one twenty first avenue san jose". At first glance, this query could map to a number of possible addresses such as:

120 first avenue san jose california
1 21st avenue san jose california
121st avenue san jose california The list of possible options is actually larger. For example, even though "san jose" is a famous city in California, there is also a city with the same name in New Mexico and another one in Illinois. The developer could potentially decide to distinguish among the options by considering the location of the user, as well as whether the number in the address specified is a valid one, by executing programming statements at various parsing states.

Furthermore, it is likely that the correct target is actually "first street", but the user makes a mistake and calls it "first avenue". Therefore, the developer may want to allow using alternative common suffixes, or skipping the suffix completely.

Finally, if the street has a direction, such as "N First Street", the user may or may not include the word "north" in the query, and if included, may put it in the wrong place as in "first street north" instead of "north first street".

Given the database of street addresses and their valid street number ranges, using extended pattern tables, interpret blocks and action statements, all of the above can be achieved efficiently in this system.

One implementation would start with the following interpret block that includes an interpret statement with an extended pattern table that, when the matches are returned, uses an auxiliary table to look up valid street addresses for particular streets:

```
public block (string full_address) US_STREET_AD-
DRESS( ){
  interpret {[100 n_number=STREET_NUMBER( ).[1/200
     "on"]].
  n_street=US_STREET_ADDRESS_TABLE( )} as {
  /*programming statements to perform logic involving
     auxiliary table*/
  }
}
``` the weights in this interpret statement are explained below.

The optional STREET_NUMBER( ) block captures a number in the address and returns its value as a street address number. This block can process input tokens that are as simple as a digit sequence, which, once defined can be easily used, or it can be extended to support more complex cases such as street numbers with dashes, fractions or letters of the alphabet. The modularity of this block supports incremental extension from simple to more complex cases.

The next entity is a more detailed example of an extended pattern table US_STREET_ADDRESS_TABLE( ) that can represent all the variations of all the street addresses that the developer intends to support. This table is sometimes called an extended pattern table in contrast to bigram and trigram sequences in conventional statistical language models. An extended pattern table is used to parse the meaning of a token sequence, rather than predict the likelihood that a speaker or typist would utter or enter the token sequence. Here are a few sample rows of such a street name extended pattern table, which also appear as rows in the table in FIG. 7.

```
table (unsigned id, string name) US_STREET_AD-
DRESS_TABLE [
  [[123456 "N First Street"]
  (
      ([10 "north"]. "first". [50 ("street"|(1/10 ("avenu-
          e"|"road")))])|
      (1/5 "first". [50 ("street"|(1/10 ("avenue"|"road")))].
          "north")
  ). [1/10 "in"]. "san jose". ["california"|0.01 "c. a."]
  ],
  [[123457 "1st Avenue"]
      ("first". [50 ("avenue"|(1/10 ("street"|"road")))])
      .[1/10 "in"]. "san jose". ["california"|0.01 "c. a."]
  ],
  [[123458 "21st Avenue"]
      ("twenty   first".   [50   ("avenue"|(1/10
          ("street"|"road")))])
      .[1/10 "in"]. "san jose". ["california"|0.01 "c. a."]
  ],
  /*etc.*/
]
```

This table has several notable characteristics. First, the table returns two values: an "id", a unique number which points to a data structure that contains or refers to information about each street, such as a list of valid street number and the full name of the street as a string. The street name alone is provided here as an example of multiple return values. Other information such as the street's city, state and geo coordinates can also be part of the data structure that the id points to.

Second, "N first street" has the direction "north" before the street name. In the table above the developer allows the presence of "north" to be skipped with a penalty. Since there is a weight of 10 before the optional "north", written as [10 "north"], the interpret pattern parser normalizes skipping north to have a probability of 1/(10+1)=1/11, while presence of north has the probability of 10/11. Alternatively, "north" can come after the street name, with a weight of 1/5, which again is normalized by the interpret pattern to have a probability of 1/(1+1/5), since sum of weights need to add up to 1. For each variation where "north" appears, the "street" suffix can be skipped completely, but with a weight of 1/51. If a suffix is provided, it can be the correct suffix "street" with the weight of 1/(1.1). Common alternatives of "avenue" and "road" have a joint weight of 0.1/1.1=1/11. Since there are 2 alternatives, each gets a weight of 1/2 of that, i.e., 1/22. A modified regular expression style syntax can used as seen with weights prefixing speech recognition results (or text inputs) as quoted strings combined with symbols such as pipe ("|"), parenthesis ("( )"), brackets ("[ ]"), and period (".") used to express alternatives, grouping, optionality, and conjunction. In one embodiment, weightings are automatically normalized and so the table expression to recognize any one of a, b, or c: (10 "a"|5 "b"|"c"), would have normalized weights of 10/16 "a", 5/16 "b" and 1/16 "c". Note that a weight of 1 was assumed for "c".

Third, this table includes "N First Street", "1st street" and "21st avenue", which all match the query example above. Assuming no other row of the table matches that query example, then the table entry that is pointed to by "N First Street", returns 2 rows of the table for when "one twenty" is matched to the street number, and 1 row of the table when "one" is matched to the street number. The action statements in the programming language inside the interpret block can then evaluate various conditions, including the weight of the matched row, the range of street numbers in that row, the current location of the user and the distance from that location to the location of the matched row, to pick at least one result. See below discussing FIG. 11, where action statements that adjust the weighting based on the distance between the user the matched location are discussed.

Here is an example of the action statements that perform the logic inside the interpret block, written in C++. From the US_STREET_ADDRESS( ) interpret block we obtain the variable n_number which is set to a street number, if one is present, and the variable n_street, which points to an entry in an extended pattern table of US streets. In the specific implementation, n_street is the head of a linked list of specific streets, each with a full street name and other properties. The code below determines the street with the best weight among the candidate streets. When performing this comparison, it takes the street number into account by calling an auxiliary function to check if a particular number is valid on a particular street. Here is are the action statements for the US_STREET_ADDRESS( ) block:

```
float best_weight = 0;
float item_weight;
unsigned best_id = 0;
/* Iterate through the linked list starting at n_street */
for (size_t match_num = 0; match_num <= n_street->additional_matches ; ++match_num){
    item_weight = n_street->weight;
    if (n_number){
        /*check to see if the street number is valid for n_street->id. if not, penalize
        item_weight or exclude it */
        if (!valid_number(n_number->value, n_street->id)) {
            //excludethis( );                  // complete exclusion
            item_weight *= 0.001;              // strong penalization
        }
    }
    /* keep track of the best id found so far */
    if ((item_weight > best_weight)
    {
        best_weight = item_weight;
        best_id=n_street->id;
    }
    n_street=n_street->next_match;
}
```

```
if (best_id!=0) {
    /* compose the full address based on best_id and n_number, and return as the
full address of the block */
} else {
    excludethis( );
}
```

The program above can be extended to include additional logic such as the user location (see FIG. 11 discussion), skipping the city and choosing the right target based on population and location, and so on. The matching pattern can be made to return a result with fewer token matches by making the. "san jose". segment optional, using square brackets as in: . ["san jose"]. When "san jose" is mandatory, the table analysis will not return a completed phrase recognition if the token list omits the city name. Having provided an overview, the system will now be described in greater detail.

Figures Discussed

FIG. 1 illustrates a block diagram of an example environment 100 in which the meaning parser and new programming constructs can be used for custom natural language understanding the environment 100 includes at least one client computing device 155, 156 that includes a processor and at least one application running on the processor 157. An application parser 130 and a phrase interpreter engine 117. The environment also includes a communications network 135 that allows for communication between various components of the environment. During operation, developers prepare and submit application code 140. Application code 140 can be stored for later processing or submitted directly to the application parser 130. The application code may reference custom statistical language models 110 (SLMs) and extended pattern tables 115. These SLMs and tables may be submitted with the application code 140 or may previously have been submitted by or made available to developers.

In one implementation, the network 135 includes the Internet. The network 135 also can utilize dedicated or private communication links that are not necessarily part of the Internet. In one implementation the network 135 uses standard communication technologies, protocols, and/or inter-process communication technologies.

Applications are used with the phrase interpreter engine 117 to understand spoken or text input. The client computing devices 155, the application parser engine 130 and the phrase interpreter engine 117 each include memory for storage of data and software applications, a processor for accessing data in executing applications, and components that facilitate communication over the network 135. The computing devices 155 execute applications, such as web browsers (e.g., a web browser application 157 executing on the computing device 156), to allow developers to prepare and submit application code 140 and allow users to submit phrases to be interpreted by the phrase interpreter engine 117. The computing devices 155, 156 may be for example a workstation, desktop computer, laptop, a tablet computer, mobile phone, or any other type of computing device.

The application parser engine 130 receives applications and parses them, producing a parse tree or an event stream. It produces application data structures 120 from the parsed application code 140. An application data structure 120 may represent a single application 140. Alternatively, multiple applications 140 may be used to prepare a single application data structure 120. The application data structure can, for instance, be a tree, a state machine, or a network of valid tokens. The application data structure can be compiled or in an interpretable structure. The application data structure 120 can include nodes that reference the custom SLMs 110 and the extended pattern tables 115. This data may be stored collectively or in copies on multiple computers and/or storage devices.

The acoustic-language recognizer 128 can be a conventional acoustic or speech recognition component that outputs tokens. It can operate in one or more stages. In this application, an acoustic-language recognizer or processor 128 can potentially only include a single stage, acoustic recognition-only processing without application of separate linguistic analysis. The technology disclosed can be applied to coupling preliminary processing to meaning-specific patterns, even when the tokens from preliminary processing are phonemes or other tokens that are not full words. For instance, an acoustic stage can process input sound samples to produce phonemes. These phonemes can be passed to a language or linguistic stage that considers and scores sequences of phonemes. Language recognizers sometimes use diphone or triphone analysis to recognize likely sequences of phonemes. Language recognizers sometimes use statistical language models to recognize statistically likely sequences of words.

Phrase interpreter engine 117 includes an acoustic-language recognizer 128 and the meaning parser 118. The phrase interpreter engine 117, like the application parser engine 130, is implemented using at least one hardware component. The engines are implemented in hardware, firmware, or software running on hardware. Software that is combined with hardware to carry out the actions of a phrase interpreter engine 117 can be stored on computer readable media such a rotating or non-rotating memory. The non-rotating memory can be volatile or non-volatile. In this application, computer readable media does not include a transitory electromagnetic signal that is not stored in a memory; computer readable media stores program instructions for execution.

Figure 2:
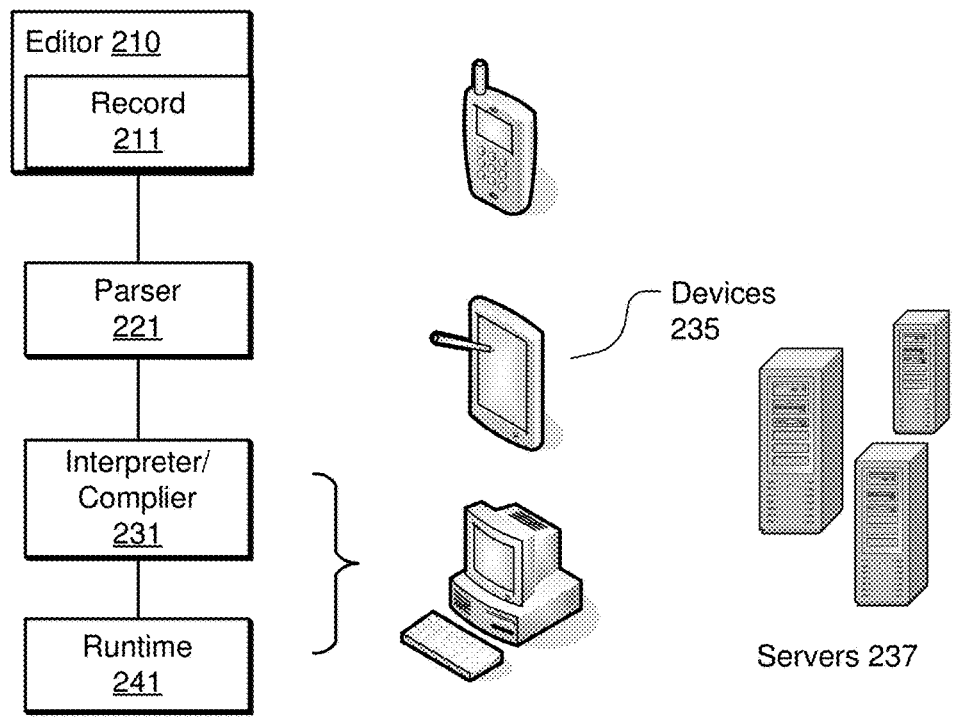
FIG. 2 is a high-level sequence diagram of actions and associated components from application development through runtime.

FIG. 2, in overview, includes an editor 210 used to generate at least one electronic record 211 that includes code with the programming constructs disclosed. The electronic record 211 is transmitted to a parser 221, which may build a parse tree or emit a series of events. The parser output is used by an interpreter or compiler 231 to create executable pseudocode or object code. The runtime system 241 uses the pseudocode or object code to recognize natural language.

FIG. 2 is a high-level sequence diagram of actions and associated components from application development through runtime. The components illustrated in FIG. 2 operate on computing devices that include a processor and memory coupled to the processor. While components are indicated by blocks, systems that implement the technology disclosed may include subdividing the indicated blocks into more components or combining multiple components into fewer blocks. For instance, computer-aided software engineering tools (CASE), such as an integrated development environment (IDE), may include a smart code editor that recognizes the programming constructs disclosed. Smart editors check syntax using edit time parsing to recognize keywords and the structures implied. An integrated development environment also may invoke an interpreter or compiler. Some IDEs also include runtime support for debugging a program. Debugging tools recognize the programming constructs disclosed. They allow a programmer to set breakpoints and monitor program execution. Accordingly, there is a range of environments that can implement the technology disclosed, from authoring through launched applications.

A smart program editor 210 can recognize the programming constructs and keywords corresponding to the technology disclosed. It can color code or otherwise highlight the keywords. It may check the syntax of the programming constructs disclosed as a programmer types. It can create stub code for structures to be completed by the programmer. While smart editors have been used for many years, the programming constructs disclosed herein are new to natural language understanding programming, and offer new opportunities for developer support.

Regular editors also can be used to author electronic records including program code. When a regular editor is used, a pretty printer that recognizes the disclosed programming constructs can be used to format the code to make it more readable. Code formatting is often supported in CASE tools, IDEs and smart editors. Still, there are standalone code pretty printing products, not shown in FIG. 2, that can apply the technology disclosed.

A parser 221 receives one of more records 211 and converts them to machine recognized format. One machine recognized format is a parse tree. Another machine recognized format is a stream of events.

An interpreter or compiler 231 uses the output of the parser. The interpreter typically uses the parser output directly in combination with a runtime 241 to execute or debug a program. An interpreter may persist an intermediate format for execution, debugging or optimized compilation. The intermediate format may be programming language independent.

A compiler typically uses the output of the parser to compile object code or pseudocode. Object code can be optimized for particular platform. Pseudocode can be machine independent and can be run on a virtual machine, instead of directly on a physical machine.

A preprocessor also may use output from the parser to expand the disclosed programming constructs into code in the programming language before its interpretation or compilation. A preprocessor may be integrated with a parser.

A variety of devices 235 are indicated which may be targets for NLU development. These devices may include handheld devices, such as smart phones and tablets, mobile devices such as laptops and workstations or PC. In addition, NLU components can be deployed to servers 237 coupled in communication with other devices 235.

In the alternatives and combinations described, there are many environments and many implementations in which the technology disclosed can be practiced.

Figure 4:
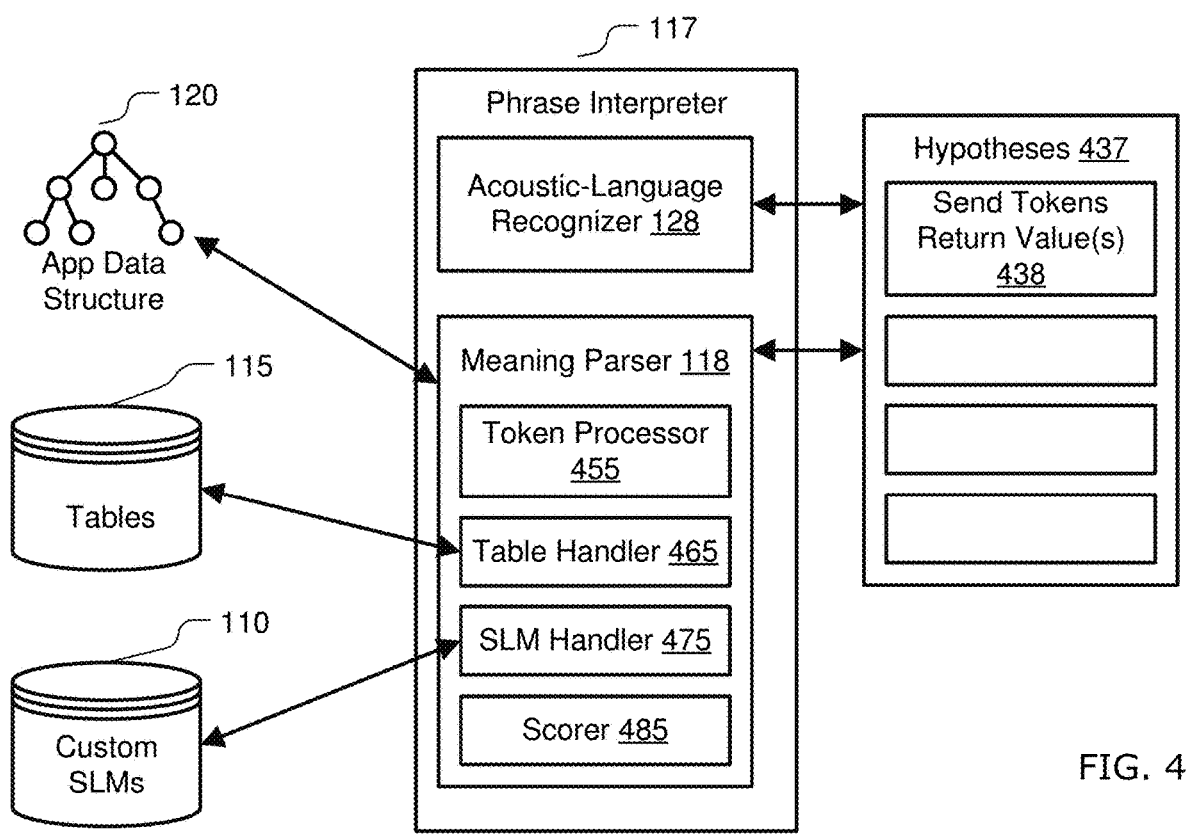
FIGS. 3 and 4 provide additional detail regarding the application parser number and the phrase interpreter.
Figure 3:
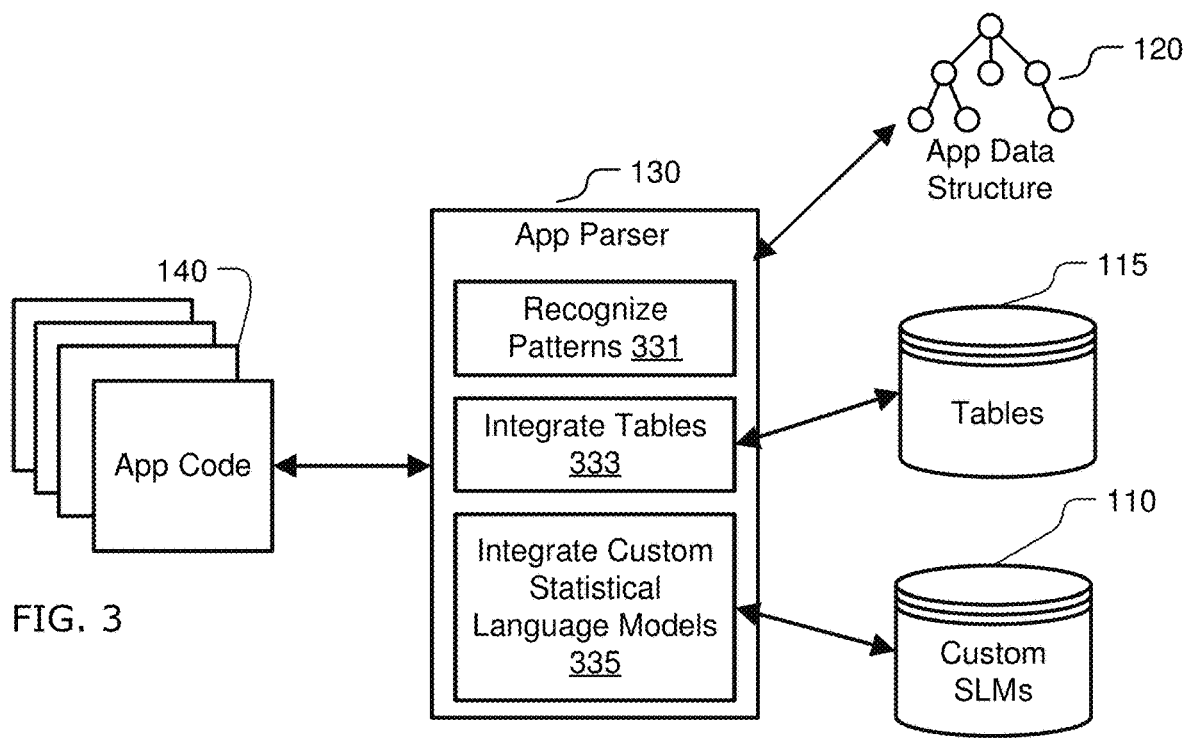

FIGS. 3 and 4 provide additional detail regarding the application parser number 130 and the phrase interpreter 117. In these figures and throughout the application, where reference numbers are reused, such as reference 120 for the application data structure, they refer to the same component as previously described. In FIG. 3, the application code 140, application parser 130, application data structure 120, extended pattern tables 115, and custom statistical language models 110 are the same components as previously described.

In FIG. 3, the application parser 130 parses application code 140. In some implementations, it recognizes interpret blocks and interpret statements, as explained in the context of the street address example above and in the context of FIG. 9 below. Other implementations may perform these actions in different orders and/or perform different or additional actions than illustrated in FIG. 3. The application parser recognizes patterns 331 in interpret statements and extended pattern tables. The extended pattern tables 115 may be stored separately from the application code 140 and reused in a variety of applications. The application parser 130 handles integration of tables 333 referred to in application code 140 with the data tables themselves, which may be stored separately 115. Similarly, the application parser 130 handles integration of custom statistical language models 335 referred to in the application code 140 with custom SLMs, which may be stored separately 110. The custom SLMs 110 may be stored separately from the application code 140 and reused in a variety of applications. Upon parsing the application code 140 and integrating it with the tables 115 and the custom SLMs 110, the application parser 130 produces one or more application data structures 120.

In FIG. 4, the phrase interpreter 117 includes an acoustic-language recognizer 128 and meaning parser 118, both of which are used to interpret spoken phrases. Of course, when a user types input or text input is received from another source, a meaning parser 118 can operate without an acoustic-language recognizer 128. Thus, the meaning parser 118 is useful by itself and can operate in text-based environments that do not receive spoken input.

When processing spoken input, the acoustic language recognizer 128 produces token phrases and alternative token recognition hypotheses 437. At each time interval during interpretation of spoken input, hundreds or even thousands of token recognition hypotheses 437 can be generated. To expand on this point, an interval such as every 10 or 100 milliseconds could be selected to test and generate token recognition hypotheses. At each interval, a thousand, three thousand, or an even larger number of hypotheses could be generated. In some implementations, enumeration of hypotheses could exhaust all combinatorial possibilities for hypotheses.

The conventional acoustic-language recognizer scores the alternative token recognition hypotheses that it produces and selects a set of token recognition hypotheses for further processing. A two-stage acoustic-language recognizer arrangement, an acoustic recognizer applies an acoustic recognition score to alternative token sequences, selects the set of token sequences and sends them to a language or linguistic recognizer. The language recognizer applies a language model, such as a statistical language model, and scores the token sequence hypotheses. It returns the scores to the acoustic recognition stage, which combines the acoustic and language recognition scores.

In general, the acoustic-language recognizer 128 sends token recognition hypotheses 437 to the meaning parser 118 as token phrases, sequences, or lists 438. The meaning parser 118 processes the tokens and returns values 438. Complete and incomplete parses of tokens can be scored by the meaning parser 118 to return meaning recognition scores. Unrecognizable token phrases can be flagged as such in the returned values. Completed parses of token phrases that satisfy a recognized pattern can further return data and/or references to data structures that express the meaning of the token phrase. Within the processing structure of the meaning parser 118, a token phrase being processed can be all or part of the token recognition hypothesis 437.

One implementation of meaning parser 118 includes a token processor 455, table handler 465, an SLM handler 475, and a scorer 485. Some implementations may have different and/or additional modules than those shown in FIG. 4. Moreover, the functionalities can be distributed among the modules in a different manner than described or illustrated. The token processor 455 receives tokens 438 in the hypotheses 437. It processes these tokens against the application data structure 120. As tables and statistical language models are encountered or invoked, the table handler 465 and SLM handler 475 are invoked. The table handler 465 handles extended patterns expressed as rows in the tables 115. Additional details of these patterns and the processing of rows are described below in the context of FIG. 7. The SLM handler 475 handles custom statistical language models 110. Mixing the indication of custom SLMs into an extended pattern, whether in an interpret statement for the role of the table creates a context for invoking the SLM. This context favors custom SLMs over general SLMs. For instance, the subject line of an email will use different language constructs and different phrases in the body of an email. Accordingly, different custom SLMs would be used in patterns for subject lines and message text.

A scorer 485 accumulates and normalizes a meaning recognition score during processing of a token phrase. The scorer 485 can generate scores for both partial and completed pattern recognition. Scoring of token sequences against patterns is the subject of FIGS. 7B-7D, below.

Meaning parser 118 further executes action statements contained within interpret statements. These action statements are discussed above in the context of the introductory example and below in the context of FIG. 9.

Figure 5:
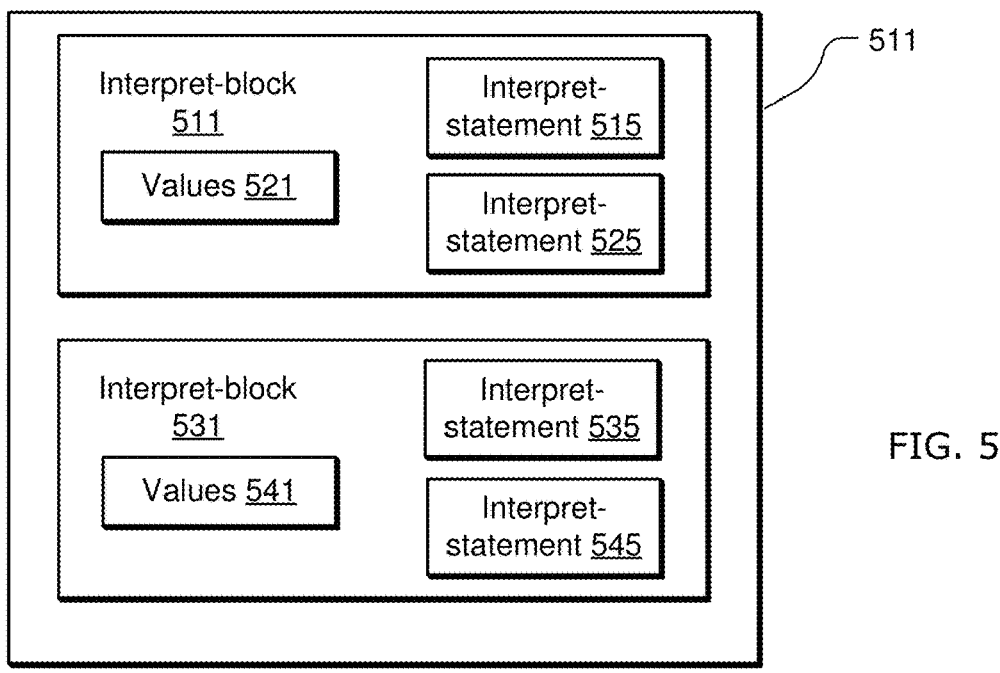
FIG. 5 is a block diagram of the programming language constructs interpret-block and interpret-statement.

FIG. 5 is a block diagram of the programming language constructs interpret-block 511 and interpret-statement 515. A program using these constructs is stored in one or more electronic records. The program includes one or more interpret-blocks 511, 531. The blocks, in turn, include one or more variables 521, 541 to be returned from the block and one or more interpret-statements 515, 525, 535, 545. Variables returned during execution of a block can be accessed by containing blocks. When the variables are declared public, the values returned also can be accessed by subsequently invoked blocks that are not containing blocks.

Figure 6:
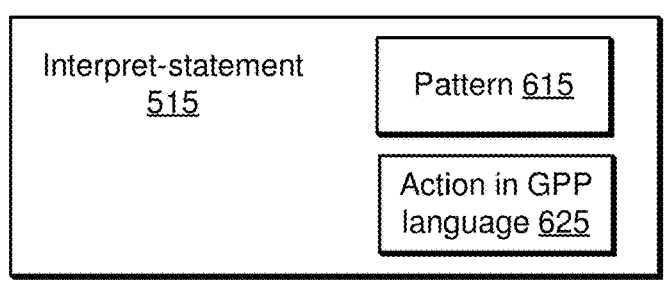
FIG. 6 is a block diagram with more detail of an implementation of the interpret-statement.

FIG. 6 is a block diagram with more detail of an implementation of the interpret-statement 615. The interpret-statement includes a pattern 615 and an action 625 triggered by matching the pattern. In some implementations, the pattern is the modified regular expression of words in a target natural language and additional interpret-blocks, as previously described. The words in the natural language are terminal symbols and the additional interpret-blocks are non-terminal symbols. While a regular expression is a convenient and well-understood pattern formulation, other patterns also can be used. Patterns in the interpret-statements are used to match text or utterances. Multiple patterns in interpret-statements can match parts of a single input text or utterance. In some implementations, a parser may flag and regroup words or word patterns that will match multiple interpret-statements, and take advantage of this to optimize the application data structure 120. Paired with patterns, the action statements include programming instructions in the extended programming language, such as a general-purpose programming language. These action statements include assigning values to the variables of the block-statement, which represent understanding of parts of the input text or utterance. The action statements may also modify the weight (score) of the parse, and eliminate parses using the special excludethis( ) statement. In the example implementation, the excludethis( ) statement is a special statement that effectively sets the weight of a parse to 0. Since weights in the example are accumulated through multiplication, a weight of 0 should remove a partial parse from the list. An example of weight modification and excludethis( ) is provided in FIG. 11. In this example, the user can ask for nearby location, which is defined in another block called LOCATION( ). If the physical location of the returned location is not within 100 miles of the user's current location, the action statement calls the excludethis( ) statement which eliminates this parse. The same approach could be extended to the location set by the user for the origin of the search. Otherwise the weight of the parse is adjusted by the value of the distance of the user from the location. This effectively gives preference to locations that are closer to the user. In other language implementations other constructs may be provided to provide similar exclusion functionality.

FIG. 7 includes FIGS. 7A-7E. It begins with a table showing three weighted patterns in the table and corresponding return references, or ids, 123456, 123457, 123458 and street names. While these extended patterns are illustrated as part of the table, similar patterns can be used to define the pattern of an interpret statement with the added capability to reference other interpret blocks, tables, and SLMs.

FIG. 7B explains normalized weighting of pattern 123456. FIGS. 7C-7E score three token phrases against the same pattern 123456. In FIG. 7B, the pattern for 123456 is expanded across three rows 723, 725, 727 to better show the nesting and weighting. Above each row are digits indicating a depth of nesting. These digits are above parentheses and square brackets. Immediately below each row is a summary of weighting juxtaposed with the rest of the pattern, e.g. "next row" and "above" designations. In an integrated development environment, nesting pairs might be indicated by matching colors of parentheses or brackets. Below each row are indications of weights assigned to segments of the pattern.

Weights are indicated in two ways. Inside curly braces, alternatives are separated by the symbol |, which means "or". Integers or floats can be used to indicate the relative weights of the alternatives. For instance, the pattern in lines 723, 725 implicitly assigns a weight of one to the part of the pattern at nesting level 2 in 723 and a weight of 1/5 to nesting level 2 in 725. The weight of one is implicitly assigned because no explicit weight is given for nesting level 2 in 723. The weight given in curly brackets at the beginning of line 723 expresses the ratio between alternatives as "{5|1}" to indicate that the first alternative in line 723 has five times as much likelihood and weight as the second alternative in line 725. A second type of weight is indicated by fractions without curly brackets, tracking optional pattern elements that appear in square brackets. For instance, in line 723, the pattern element "north" is indicated as optional within square brackets. The weight 10 precedes the token. This indicates that it is 10 times as likely that the token "north" will precede "first" in a reference that means "N. 1st Avenue", as it is likely to be omitted. When the token "north" appears in the token phrase, this term in the pattern is given a weight of 10/11. When the token is omitted, this term in the pattern is given a weight of 1/11. With this explanation in mind, the following scoring examples can readily be understood.

FIGS. 7C-7E are scoring examples. The three rows in pattern 123456 are reproduced as rows 733, 735 and 737 of FIG. 7C; rows 743, 745 and 747 of FIG. 7D; and rows 753, 755 and 757 of FIG. 7E. Nesting levels appear above parentheses and brackets in the pattern. Resulting weights appear in curly braces below the pattern.

In FIG. 7C, the first half of the disjunction between lines 733 and 735 is matched. Accordingly, weights are assigned to line 733 and not to line 735. As between the two alternatives, the total weight available is 5/6 for line 733 and 1/6 for line 735. In curly braces, this is expressed as 1/(1+1/5). In the scored token string "north first street san jose", the token "north" appears, so weight of 10/11 is assigned. The token "first" is mandatory for a pattern match and it appears with an implicit weight of one. One of the tokens "street", "avenue", or "road" appears, the first of which is 50 times as likely as an alternative, so a weight of 50/51 is assigned. Since "street" is being matched in this case instead of the alternatives "avenue" or "road", a weight of 1/(1+1/10) is assigned. This is because the alternatives are grouped together and therefore the normalization of weight is applied between "street" and the group of "avenue" or "road". If the query had "road" instead of "street", the weight would have been 0.1/1.1 for matching the group and 1/2 for matching "road" in the group.

The token string does not include the optional word "in", which is weighted as unlikely to be used. The omission of this token effectively has a weight of 10/11. The token string also omits the state, which is equally likely to appear be omitted, so a weight of 1/2 is applied to the omission.

The partial scores illustrated in this figure can be combined by multiplying them together. Each of the partial scores is between zero and one. The product of the scores also will be between zero and one. In another implementation, an average of the scores could be calculated, which also would be between zero and one. Both multiplicative and additive approaches can be used, for instance, multiplying together weights in a pattern segment (between two periods) and taking the average of weights across the pattern segments.

In FIG. 7D, the second half of the disjunction between lines 733 and 735 is matched. Accordingly, weights are assigned to line 735 and not to line 733. In curly braces, this is expressed as 5/(1+1/5). In the scored token string "north first street san jose", the token "north" appears, so weight of 10/1 is assigned. The token "first" is mandatory for a pattern match and it appears with an implicit weight of one. One of the tokens "street", "avenue", or "road" appears, the first of which is 50 times as likely as an alternative, so a weight of 50/51 is assigned. Since "street" is being matched in this case instead of the alternatives "avenue" or "road", a weight of 1/(1+1/10) is assigned. The token string does not include the optional word "in", which is weighted as unlikely to be used. The omission of this token effectively has a weight of 10/11. The token string also omits the state, which is equally likely to appear be omitted, so a weight of 1/2 is applied to the omission.

In FIG. 7E, is similar to FIG. 7C, but omitting "north" from the token list. The first half of the disjunction between lines 733 and 735 is matched because "north" is mandatory in the second line 735. Accordingly, weights are assigned to line 733 and not to line 735. As between the two alternatives, the total weight available is 5/6 for line 733 and 1/6 for line 735. In curly braces, this is expressed as 1/(1+1/5). In the scored token string "north first street san jose", the token "north" is omitted, so weight of 1/11 is assigned. The token "first" is mandatory for a pattern match and it appears, with an implicit weight of one. One of the tokens "street", "avenue", or "road" appears, the first of which is 50 times as likely as an alternative, so a weight of 50/51 is assigned. Since "street" is being matched in this case instead of the alternatives "avenue" or "road", a weight of 1/(1+1/10) is assigned. The token string does not include the optional word "in", with a weight of 10/11. The token string also omits the state, with a weight of 1/2 is applied to the omission.

These tables, with extended patterns or simple patterns, can be combined with statistical language models as illustrated by the following example.

It is quite possible for a sequence of input tokens to have more than one parse (or partial parse), with each parse having its own weight. The weights for all of the partial parses can be combined to represent the total weight (or probability) of a sequence of tokens. The weight of a sequence of tokens is useful and can be used, for example, as the score of the sequence of tokens in a speech recognition engine where multiple sequences of tokens are being considered. In one implementation, the total weight is the sum of all the weights, which makes statistical sense as weights are considered to be probabilities (the probability of a sequence of tokens is the sum of the probabilities of all its possible parses). In another implementation, the maximum weight can be used. In yet another implementation, the average of the weights can be calculated. To give an example of an implementation that adds the sum of multiple parses (or multiple options returned by a table) consider the table of FIG. 12, which is a portion of a table block that represents song titles. This table may have thousands or even millions of rows but only 3 rows are shown in this example. The weight for each record can represent a measure of popularity, and if normalized to add up to one, can be considered the probability of the record. The system is capable of automatically normalizing weights to 1, as explained in the example of FIG. 7, which saves a developer the burden of verifying correct sums of weights. If the user asks for "I just called to say I love you by stevie wonder", then the popularity measure of 0.01 is used (in addition to the appropriate adjustment of 1/2 to skip the optional "by"). However, if the user asks for "I just called to say I love you", then there are multiple matches in the table, and the weights can be added because the probability of the user asking for this song title should be the sum of the probabilities of all songs with this title.

Further Email Example Using SLM Pattern

In another example, an interpret block is used with a table and two custom statistical language models to compose an email message. The table is a simple table of contacts. The SLMs are for subject and message.

Consider the following pattern portion of an interpret statement:

interpret ("email". CONTACT( ). "subject". SUBJECT( ). "message". MESSAGE( )}

In the above example, CONTACT( ) is a table pattern representing a list of valid contacts in a database that the user can send emails to. SUBJECT( ) represents a statistical language model, while MESSAGE also represents a statistical language model, and the developer can choose to use a different language model for each. This makes sense as the statistical properties of an email subject could be different from that of the body of an email.

Given the query, "email ernie subject lunch meeting message i am running late", the system matches "ernie" as the recipient (assuming Ernie is in the CONTACT( ) database), the subject becomes "lunch meeting" and the body of the email becomes "i am running late". The system scores the subject line using the statistical language model represented by SUBJECT( ), and the body of the email using the statistical language model represented by MESSAGE( ). The system can do that because as it is parsing the query, it knows the state of its various parses. Now assume the following query:

"email ernie subject lunch meeting message message me when you get here"

The above query can be interpreted in multiple ways, most notably whether the word "message" is part of the subject:

Subject: lunch meeting
Message: message me when you get here or part of the body:

Subject: lunch meeting message
message: me when you get here

Although both of these parses are valid, if the statistical language models are trained properly, the second parse should hopefully have a lower score, since "me when you get here" is a less likely body of a message.

The ability to switch between blocks, tables, and multiple statistical language models depending on the state of the parse, and execute programming statements at any point during the parse, makes the system a very powerful tool that can be used to implement a wide variety of tasks.

Discussion of Code with Interpret Blocks and Interpret Statements

The code in FIG. 9 is an example of one implementation of the technology disclosed. This example applies natural language understanding to requests to a calculator to perform calculations. This code, written as an extension of C++, is unmistakably more elegant than the prior art FIG. 8 from GF. The prior art GF code is written with multiple levels of abstraction in a special purpose programming language. Significant specialized expertise is required to even read the prior art code in FIG. 8. In contrast, one of ordinary skill in the art could well read the code in FIG. 9 and understand it with a general orientation, instead of a manual that is dozens or hundreds of pages long.

The technology disclosed can be used to extend a programming language by the addition of a small number of constructs. Alternatively, the technology can serve as a core around which a programming language is designed. In some implementations, the technology disclosed is used to extend a mainstream, well-understood programming language such as C++. In other implementations, it may extend other programming languages such as Objective C, C#, Javascript, Java, Python, Ruby, or Perl. Extending a general purpose programming language takes advantage of an existing large pool of programmers who already are familiar with the language. The technology disclosed also could be incorporated into a special purpose programming language with benefits to those who understand or choose to learn the special purpose language.

The technology disclosed juxtaposes patterns and actions in two programming constructs, which we call interpret-blocks and interpret-statements. Interpret-statements such as 913, 914, 928 include both a pattern and an action to be performed (or action statements) when the pattern matches an input text or utterance. The patterns in this example are modified regular expressions of terminal and non-terminal symbols, with optional weights. For instance, in interpret-statement 928 of FIG. 5b, the natural language word to match is "minus", which is called a terminal symbol by those working in NLU. The actions triggered by various pattern matches are expressed in a general purpose programming language. When the word "minus" is understood, the C++ code in the "as" clause (action statement) of the interpret statement 928 assigns op=SUB_OP, which later causes the higher-level interpret-block 921 to perform subtraction in "else if" clause 923. As noted above, the patterns can include non-terminals that invoke other blocks, pattern tables, and SLMs.

In one page and a little more of FIGS. 9B-C, with two interpret-blocks and a handful of interpret-statements contained within the interpret-blocks, a programmer has specified understanding and execution of natural language infix expressions (with the operator between the operands) for addition, subtraction, multiplication, division, exponentiation and percentage calculation. Assignment of enumerated values in the ARITH_INFIX_TAIL( ) interpret-block 926 enables the ARITH_INFIX( ) block 921 to trigger C++ code that carries out natural language requests for calculations. The pattern matching of terminals in block 926 and of a non-terminal infix expression block 921 compactly ties matching patterns to triggering of action instructions written in a programming language, such as a general-purpose programming language.

To summarize, FIG. 9A-D are four pages excerpted from a longer working NLU vertical application for a calculator that can be expressed in nine pages of clear and readable code. The excerpts from this nine-page program extend a general purpose programming language with just two programming constructs and use the general purpose language to implement actions triggered by matched patterns. Together with FIG. 10, the code samples provided apply the programming constructs disclosed.

FIGS. 10A-10C are four pages excerpted from code from a longer working NLU application that handles dates. Interpretation of natural language that expresses a date is more challenging than implementing a calculator, as described below, because dates can be expressed in so many ways. In this excerpt, recurring dates are excluded 1013; today, tomorrow and the next day are handled 1014, 1015, 1016; a day of week and date of month are combined 1021; a day of week and ordinal number are combined 1026; a part of day, such as morning, is combined with an ordinal number 1031; a legal document date style is handled 1033; and a day of week is combined with "this" or "next" week 1036. As discussed, "include" statements 1011 can cause several interpret blocks (.ter files) to be included in the code before the DATE( ) interpret block 1012. Several interpret-statements 1014, 1015, 1016, 1021, 1026, 1031, 1033, 1036 appear in block 1012.

The exclude-statement 1013 stops execution of the block without processing subsequent interpret-statements and without assigning values to the block variables 1012, when the input includes phrases that indicate recurring dates, as this block does not handle recurring dates. In one embodiment, exclude statements are a type of interpret statement.

Interpret-statements 1014, 1015, 1016 handle the words "today", "this", "tomorrow" and "day after tomorrow". Optional words that do not change the selected date include approximate times of day, such as "morning", "evening", "afternoon" etc. Some of these optional words may trigger assignment of a positive value to the variable "pm_hint". Parts of the pattern in interpret-statement 1014, for instance, cause values to be assigned to n1 or n2. If values have been assigned to n1 or n2, the last line in 1014 resets pm_hint from 0 to 1. In various other interpret-statements, several qualitative block variables 1012, such as month_index_implicit, year_index_implicit, week_delay and pm_hint are given values.

Interpret-statements 1021, 1026, 1031, 1033 and 1036 include weights 1022, 1027, 1032, 1034, 1037 assigned when optional approximate times of day are part of the input. Four of the five interpret-statements use the same weight. The fifth 1033, assigns a much smaller weight 1034. These weights can be used by a runtime system to select among multiple interpret statements that may be triggered by a particular input pattern. In some implementations, the parser automatically normalizes weights returned by interpret-statements and parts of interpret-statements. Normalizing weights to total one another chosen value simplifies human understanding of output and debugging output when the example code runs. Normalizing weights to sum to one effectively produces a Bayesian probability distribution that can be used at runtime.

The DATE( ) example in FIG. 10 illustrates the power of extending a general purpose programming language through the juxtaposition of patterns with actions. The general purpose programming language is used in this example and others to convey complex logic that could be difficult to express in a special purpose programming language. The immediate juxtaposition of patterns and actions in the interpret-statements makes it easy to see how language is being understood and what patterns are being matched. This contrasts with other approaches that rely on separate abstract syntax and concrete syntax or that express how to proceed depending on "slots" that have been filled. Notably as seen in the street address example the action statements can inter-relate complex computations including mismatches across "slots", e.g. invalid addresses. Thus if there is no "120 First Street, San Jose, Calif." that can be rejected by action statements that look up the address and cause re-interpretation of prior results. This can be particularly helpful if the other matches, e.g. "1 21st Street" is a valid address.

The main programming constructs in FIG. 9 are enumerations, interpret-blocks and interpret-statements. Enumerations 911 are programmed in the underlying general-purpose programming language, in this case in C++. A number of interpret-blocks are identified 912, 917, 921, 926, 941. Many others are unlabeled. The interpret-block ARITH_QUERY( ) 912, for instance, includes three variable arguments response, *formula and valueStr. It also includes two interpret statements 913, 914. The interpret-block is distinguished by its name; interpret-statements are distinguished by their patterns. In other implementations, the interpret-statements also could be named. Interpret-statements 913, 914 in ARITH_QUERY( ) 912 both have patterns that are non-terminal symbols, invoking other named interpret-blocks. Interpret statement 914 has a simpler pattern, "x=ARITH_CMDS( )", which invokes an interpret-block and assigns the returned value to "x". Interpret statement 913 has slightly more complicated pattern, which concatenates results from two named interpret-blocks. However, the interpret-block ARITH_WHAT( ) has no variables and therefore does not return any values. This is because the sole interpret-statement 916 in the block is triggered by literals such as "tell me" and "what is", which contribute to recognizing a natural language query, but which do not contribute to performing the desired calculation. From this example, one sees that interpret-blocks and interpret-statements can, in some cases, be configured as trivial filters that ignore parts of the input.

In FIG. 9B, the interpret-blocks ARITH_INFIX_TAIL( ) 926 and ARITH_INFIX( ) 521 combine to interpret operators in the input and execute the requested operations. One block includes multiple interpret statements 927, 928, 929 that each address a different operator, such as "plus" 927 or "minus" 928. Enumerated operators are assigned to the variable "op", which is one of the variables returned by ARITH_INFIX_TAIL( ). The other block ARITH_INFIX( ) 921 uses the value and formula returned by invoking ARITH_INFIX_TAIL( ) 926 as part of pattern in the single interpret-statement 922 contained in the block. This interpret statement includes a series of "if" and "else if" statements with the same effect as a case statement, testing the value of the variable "op" returned by ARITH_INFIX_TAIL( ) p26. For a "minus" operator 928 in the input stream, one of the else if clauses 923 matches the value of "op" and the value returned by ARITH_INFIX_TAIL( ) 926 is subtracted from the value returned by ARITH_PREFIX( ) 932.

Another example in FIG. 9D is the interpret-block ARITH_PREFIX_UNARY( ) 941, which handles unary operators. The first two interpret-statements 942, 943 take into account parentheses around unitary operators. Additional interpret-statements 944, 945 interpret various operators. Some of these interpret statements, which operate on patterns that begin with "the" could be reformulated to make "the" an optional part of a regular expression.

Overall, the code in FIG. 9 illustrates elegance of the interpret-block and interpret-statement programming constructs, implanted as an eminently readable extension of a general-purpose programming language.

Multiple interpret-statements can be invoked from a single interpret block to combine a variety of applications with a common entry point. An example follows:

```
public    block(CommandSpec    command)    ALL_COM-
MAND( )
{
   interpret {n1=CALENDAR_COMMAND( )} as
      {
         command=n1→command;
      }
   interpret {n1=PHONE_COMMAND( )} as
      {
         command=n1→command;
      }
   interpret {n1=WEATHER_COMMAND( )} as
      {
         command=n1→command;
      }
   interpret {n1=TRANSLATE_COMMAND( )} as
      {
         command=n1→command;
      }
   interpret {n1=ALARM_COMMAND( )} as
      {
         command=n1→command;
      }
   interpret {n1=ARITH_COMMAND( )} as
      {
         command=n1→command;
      }
   interpret {n1=WEB_COMMAND( )} as
      {
         command=n1→command;
      }
   interpret {n1=PLACE_COMMAND( )} as
      {
         command=n1→command;
      }
   interpret {n1=MAP_COMMAND( )} as
      {
         command=n1→command;
      }
};
```

This is one way to implement an aggregated natural language library or sub-library, as discussed in paragraphs 0085-0126 of US 2012/0233207A1, which is incorporated by reference above. More specifically, each of the above commands could have been independently developed by different individuals and entities and tied together by the common entry point by yet another developer. This creates a platform for an ever-improving system to which many developers can contribute and which many can help maintain. With this platform approach, each domain or vertical can be created or maintained by experts in that domain. For example, weather service providers can wok on the weather vertical, while navigation is created and maintained by other experts and so on.

Some Particular Implementations

In one implementation, a method is described that includes an automated method of accurately recognizing a speaker's meaning. This method includes producing and scoring partial transcriptions of a spoken phrase at intervals as the phrase is spoken using at least one acoustic-language recognition stage and a meaning parser stage. Practicing this method, at second and subsequent intervals, the acoustic-language stage generates a multiplicity of token recognition hypotheses that build on prior partial transcriptions and selects a set of the token recognition hypotheses using at least prior scoring of the prior partial transcriptions at earlier intervals and current acoustic-language scoring of the token recognition hypotheses at a present interval. The meaning parser stage concurrently processes particular token recognition hypotheses in the set of the token recognition hypotheses; determines whether a particular token recognition hypothesis has a parsable meaning; rejects unparsable hypotheses; and scores and returns at least one parsable meaning score for a particular token recognition hypothesis that has a parsable meaning. The acoustic-language recognition stage further stores for use at subsequent intervals combined scores of the token recognition hypotheses for current partial transcriptions, the combined scores incorporating at least the acoustic-language recognition scores and the parsable meaning scores.

This method or other implementations of the technology disclosed can each optionally include one or more of the following features. The acoustic-language recognition stage can prune the prior partial transcriptions used to build the token recognition hypotheses using the meaning parser stage rejections of the unparsable hypotheses. At an apparent end of the spoken phrase, the method includes selecting at least one completed transcription of the spoken phrase that has been scored as recognizable by the acoustic-language recognition stage and as parsable by the meaning parser stage.

The meaning parser stage can further take the actions of processing the token recognition hypothesis that includes at least one ambiguously expressed element and at least one dependent element that correlates with the ambiguously expressed element against an interpretation pattern and of processing and scoring the ambiguously expressed element against multiple rows of an extended pattern table that is invoked while processing the interpretation pattern, at least some of the rows declaratively expressing weighted alternative expressions of a particular ambiguously expressed element.

Handling ambiguously expressed elements further include applying logic expressed in a general programming language to process and rescore at least some of the scored rows from the extended pattern table using return values from the scored rows in combination with against at least information from a group consisting of (1) the dependent element from the token recognition hypothesis, (2) an optional element in the token recognition hypothesis, and (3) supplemental information not included in the token recognition hypothesis.

One implementation can further include applying logic expressed in a general programming language to process and rescore at least some of the scored rows from the extended pattern table, including comparing valid dependent values in an auxiliary table with the dependent element from the token recognition hypothesis.

One implementation can further include applying logic expressed in a general programming language to process supplemental information not included in the token recognition hypothesis and rescore at least some of the scored rows.

One implementation can further include applying logic expressed in a general programming language to process and rescore at least some of the scored rows from the extended pattern table against optional elements in the token recognition hypothesis.

One implementation can further include the meaning parser stage scoring the token recognition hypotheses against an interpretation pattern that includes at least one predicate condition and at least one statistical language model applied when the predicate condition is satisfied.

In some implementations, wherein a particular token recognition hypothesis includes an ambiguously expressed element and a dependent element that correlates with the ambiguously expressed element; the meaning parser stage further takes the actions of scoring the token recognition hypothesis against a plurality of interpretation patterns built from a model pattern, the model pattern implementing at least: (1) a table pattern that includes rows in an extended pattern table, at least some of the rows declaratively expressing weighted alternative expressions of a particular ambiguously expressed element; and (2) a statistical pattern that includes a predicate condition and a custom statistical language model applied when the predicate condition is satisfied. In these implementations, applying the table pattern includes scoring the token recognition hypothesis against multiple rows of the extended pattern table. In addition, applying the statistical pattern includes scoring the token recognition hypothesis against the custom statistical language model.

Processing results of scoring the tech in recognition hypothesis against rows of the table can further include applying logic expressed in a general programming language to process and rescore at least some scored rows from the extended pattern table using at least information from a group consisting of: (1) the dependent element from the token recognition hypothesis; (2) an optional element in the token recognition hypothesis; and (3) supplemental information not included in the token recognition hypothesis. This processing also can include applying the logic expressed in the general programming language to process and rescore at least some of the scored rows from the extended pattern table against valid dependent values in an auxiliary table and the dependent element from the token recognition hypothesis.

It can include applying the logic expressed in the general programming language to process and rescore at least some of the scored rows from the dependent value table against the optional element in the token recognition hypothesis.

It can include applying the logic expressed in the general programming language to process the supplemental information not included in the token recognition hypothesis and rescore at least some of the scored rows.

Other implementations may include a non-transitory computer readable storage medium storing instructions executable by a processor to perform a method as described above. Yet another implementation include a system including memory and one or more processors operable to execute instructions, stored in memory, to perform a method as described above.

In another implementation, a method is described that, in some environments accurately recognizes an intended meaning of a complete phrase. This method includes invoking an interpretation pattern that expresses a complete phrase with a meaning as a sequence of elements that include one or more words from a natural language and a table element that invokes an extended pattern table and receiving a text string of tokens that express an intended meaning, wherein the token include a combination of at least one ambiguously expressed element and a dependent element that correlates with the ambiguously expressed element, and further including one or more supplemental elements. Further includes generating a plurality of alternative interpretations of the combination of the ambiguously expressed element and the dependent element; and processing and scoring at least some tokens in the alternative interpretations against multiple rows of the extended pattern table, at least some of the rows declaratively expressing weighted alternative expressions of a particular ambiguously expressed element.

This method other implementations of the technology disclosed can each optionally include one or more of the following features.

The method can further include applying logic expressed in a general programming language to process and rescore at least some of the scored rows from the extended pattern table against at least information from a group consisting of (1) a dependent element from the text string, (2) an optional element in the text string, and (3) supplemental information not included in the text string.

In some implementations, the method further includes applying logic expressed in a general programming language to process and rescore at least some of the scored rows from the extended pattern table against valid dependent values in a dependent value table and a dependent element from the text string.

The method can further include applying logic expressed in a general programming language to process supplemental information not included in the text string and rescore at least some of the scored rows.

That it can further include applying logic expressed in a general programming language to process and rescore at least some of the scored rows from the dependent value table against optional elements in the text string; and selecting at least one intended meaning using at least the rescored rows of the extended pattern table.

Again, other implementations of this an additional methods described below also may include non-transitory computer readable storage medium storing instructions executable by a processor to perform a method is described. And another implementation may include the system including memory and one or more processors operable to execute instructions, stored in the memory, to perform a method is described. For the sake of brevity, the proviso in this paragraph is hereby applied the to the implementations in this section.

In another implementation of the technology disclosed, an automated method of building a natural language understanding application is described. The method includes receiving at least one electronic record containing programming code that interprets sequence of input tokens by extending a general purpose programming language with interpret-block and interpret-statement data structures. The interpret-block data structures include at least one of the interpret-statements and zero or more variables returned by the interpret-block. The interpret-statements include a pattern of one or more tokens, and zero or more action instructions. The action instructions perform logic not achieved by pattern matching and/or assign values to the variables of the interpret-block. The method further includes parsing the received program code to produce an executable representation of the interpret-block and interpret-statement data structures.

This method mother implementations of the technology disclosed can each optionally include one or more the following features.

At least one token of the interpret expression can be another interpret-block.

The returned parameters from other interpret-blocks are made available to the action statements inside the interpret block.

At least one token of the interpret expression can be a statistical language model. It also can be a wildcard. It can be a table of token expressions with fixed returned values for each row of the table and without any action statements. At least one sub-expression of the interpret expression is allowed to have repetitions. At least one of a minimum and a maximum number of repetitions of a sub-expression can be specified. The outgoing weights at each token can be normalized to add up to 1. The normalization of outgoing weights can be performed at sub nodes instead of tokens to reflect the way the expression is modularized.

Again, this method also can be practiced in a non-transitory computer readable storage medium or by a system.

In another implementation, a method is described that includes scoring a partial transcription of input. Practicing this method includes instantiating in memory at least one data structure derived from programming code that interprets token list using a general purpose programming language extended with interpret-block and interpret-statement data structures. The interpret-block data structures include at least one of the interpret-statements and one or more values returned by the interpret-block. The interpret-statements include patterns that are built from words in a target natural language, from at least one extended pattern table, and from references to additional interpret-blocks and action instructions in the general purpose programming language that are triggered by a match between parts of an input text and the patterns. The extended pattern table matches and scores at least part of the token list against multiple rows of in the extended pattern table, at least some of the rows declaratively expressing weighted alternative expressions of ambiguously expressed elements. The action instructions assign values to the variables of the interpret-block, which values attribute meaning to the token list. The method further includes receiving the token list and processing and scoring the token list against the data structure including scoring at least part of the token list against multiple rows of the extended pattern table, at least some of the rows declaratively expressing weighted alternative expressions of a particular ambiguously expressed element.

This method mother implementations the technology disclosed can each optionally include one or more of the following features. The action instructions can further include logic expressed in the general programming language to process and rescore at least some of the scored rows from the extended pattern table using at least information from a group consisting of: (1) a dependent element in the token list that has meaning in a context set by an ambiguously expressed element in the token list; (2) an optional element in the token list; and (3) supplemental information receive in addition to the token list.

The action instructions further can include logic expressed in a general programming language to process and rescore at least some of the scored rows from the extended pattern table comparing valid dependent values in an auxiliary value table with the dependent element.

The action instructions further can include logic expressed in a general programming language to process and rescore at least some of the scored rows from the extended pattern table using the optional element.

The action instructions further include logic expressed in a general programming language to process the supplemental information not included in the token list and rescore at least some of the scored rows.

Again, this method also can be practiced in a non-transitory computer readable storage medium or by a system.

In another implementation, method is described that includes building a natural language understanding (abbreviated NLU) data structure. This method includes receiving at least one electronic record containing programming code that interprets an input text by extending a general purpose programming language with interpret-block and interpret-statement data structures. The interpret-block data structures include at least one of the interpret-statements and one or more variables returned by the interpret-block. The interpret-statements include patterns that are built from words in a target natural language, from at least one extended pattern table and from references to additional interpret-blocks and action instructions in the general purpose programming language that are triggered by a match between parts of an input text and the patterns. The extended pattern table matches and scores at least part of the input text against multiple rows of in the extended pattern table, at least some of the rows declaratively expressing weighted alternative expressions of ambiguously expressed elements. The action instructions assign values to the variables of the interpret-block, which values attribute meaning to the text. The method further includes parsing the received program code to produce a data structure representing the interpret-block and interpret-statement data structures.

This method and other implementations of the technology disclosed can each optionally include one or more of the following features.

The pattern specified in the interpret-statement data structure can include a regular expression of the words and the additional interpret-blocks. The extended pattern table can be invoked by an antecedent event selected from a group at least consisting of: a match between part of the word hypothesis and at least one word in the natural language that is part of the pattern preceding the extended pattern table; and positioning of the extended pattern table as a first element of the pattern.

The general purpose programming language can belong to a "C" programming language family.

The set of the interpret-blocks collectively can define a vertical application of NLU.

Values assigned to the variables of a particular interpret-block can be available to additional interpret-blocks and to a NLU processor at run time.

Patterns in the interpret-statements in the set of interpret-blocks collectively can match substantially all of a vertical application vocabulary that is recognized by the vertical application of NLU.

The method can further include receiving a plurality of sets of the interpret-blocks that define a plurality of vertical applications and parsing the plurality of sets of interpret-blocks.

The interpret-block can further include at least one exclude-statement that contains an exclude pattern that is built from words in a target natural language and matching of the pattern in the exclude-statement causes an exit from the interpret-block without further processing of include-statements.

The patterns of the include-statements include relative weights assignable to matches of patterns or partial patterns.

Again, this method also can be practiced as code stored on a non-transitory computer readable storage medium or on running a system.

In another implementation, parser running on a processor is described that builds a representation of natural language understanding (abbreviated NLU). This parser includes, program instructions running on at least one processor that cause the processor to receive at least one electronic record containing programming code that interprets text or utterances by extending a general purpose programming language with interpret-block and interpret-statement data structures. The interpret-block data structures include at least one of the interpret-statements and one or move variables returned by the interpret-block. The interpret-statements include a pattern that is built from words in a target natural language or from references to additional interpret-blocks and action instructions in the general purpose programming language that are triggered by a match between parts of the text or utterances and the pattern. The action instructions assign values to the variables of the interpret-block, which values attribute meaning to the text or utterances. The parser parses the received program code to produce a parse tree that represents the interpret-block and interpret-statement data structures.

This parser in other implementations of the technology disclosed can optionally include one or more of the following features.

The pattern specified in the interpret-statement data structure can include a regular expression of the words and the additional interpret-blocks. The general purpose programming language belongs to a "C" programming language family. The values assigned to the variables of a particular interpret-block are available to additional interpret-blocks and to a NLU processor runtime. A set of the interpret-blocks collectively can define a vertical application of NLU.

The patterns in the interpret-statements in the set of interpret-blocks can collectively match substantially all of a vertical application vocabulary that is recognized by the vertical application of NLU.

Operation of the parser can further include receiving a plurality of sets of the interpret-blocks that define a plurality of vertical applications and parsing the plurality of sets of interpret-blocks. The interpret-block can further include at least one exclude-statement that contains an exclude pattern that is built from words in a target natural language and matching of the pattern in the exclude-statement causes an exit from the interpret-block without further processing of include-statements.

The patterns of the include-statements can further include relative weights assignable to matches of patterns or partial patterns.

Any of the methods described herein can be implemented as a computer-readable storage medium loaded with instructions that, when run on at least one processor, cause the processor to carry out the methods described. While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method of building a natural language understanding application, the method including:
   receiving at least one electronic record containing programming code; and
   creating executable code from the programming code,
   wherein the executable code, when executed by a processor, causes the processor to create a parse and an interpretation of a sequence of input tokens,
   wherein the programming code includes an interpret-block,
   wherein the interpret-block includes an interpret-statement,
   wherein the interpret-statement includes a pattern expression, and
   wherein the interpret-statement includes an action statement.

2. The method of claim 1, wherein the pattern expression includes pattern tokens.

3. The method of claim 2, wherein the pattern tokens are associated with weights.

4. The method of claim 3, wherein the weights are automatically normalized.

5. The method of claim 2, wherein at least one pattern token refers to a second interpret-block.

6. The method of claim 5, wherein the second interpret-block has a return variable, and a value of the return variable is made available to the action statement.

7. The method of claim 1, wherein an extended pattern token table refers to a table of token expressions, and each row in the table has a fixed returned return value, and has no associated action statement.

8. A non-transitory computer-readable recording medium having computer instructions recorded thereon for building a natural language understanding application, the computer instructions, when executed on one or more processors, causing the one or more processors to implement operations comprising:
   receiving at least one electronic record containing programming code; and
   creating executable code from the programming code,
   wherein the executable code, when executed by a processor, causes the processor to create a parse and an interpretation of a sequence of input tokens,
   wherein the programming code includes an interpret-block,
   wherein the interpret-block includes an interpret-statement,
   wherein the interpret-statement includes a pattern expression, and
   wherein the interpret-statement includes an action statement.

9. The non-transitory computer-readable recording medium of claim 8, wherein the pattern expression includes pattern tokens.

10. The non-transitory computer-readable recording medium of claim 9, wherein the pattern tokens are associated with weights.

11. The non-transitory computer-readable recording medium of claim 10, wherein the weights are automatically normalized.

12. The non-transitory computer-readable recording medium of claim 9, wherein at least one pattern token refers to a second interpret-block.

13. The non-transitory computer-readable recording medium of claim 12, wherein the second interpret-block has a return variable, and a value of the return variable is made available to the action statement.

14. The non-transitory computer-readable recording medium of claim 8, wherein an extended pattern token table refers to a table of token expressions, and each row in the table has a fixed returned return value, and has no associated action statement.

* * * * *